(12) United States Patent
Kohigashi et al.

(10) Patent No.: US 8,182,380 B2
(45) Date of Patent: May 22, 2012

(54) POWER TRANSMISSION DEVICE

(75) Inventors: Kenta Kohigashi, Wako (JP); Tomoaki Ishikawa, Wako (JP); Keiji Iino, Wako (JP); Tomokazu Kimura, Wako (JP); Nobuyuki Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 237 days.

(21) Appl. No.: 12/466,157

(22) Filed: May 14, 2009

(65) Prior Publication Data

US 2009/0291787 A1 Nov. 26, 2009

(30) Foreign Application Priority Data

May 21, 2008 (JP) ................................ 2008-133692
May 21, 2008 (JP) ................................ 2008-133699

(51) Int. Cl.
*F16H 9/00* (2006.01)
*F16H 59/00* (2006.01)
*F16H 61/00* (2006.01)
*F16H 63/00* (2006.01)
*F16H 7/00* (2006.01)

(52) U.S. Cl. ................ 474/5; 474/58; 474/86
(58) Field of Classification Search .............. 474/5, 86, 474/58
See application file for complete search history.

(56) References Cited

U.S. PATENT DOCUMENTS

| | | | | |
|---|---|---|---|---|
| 674,794 A | * | 5/1901 | Capel | 474/5 |
| 2,445,797 A | * | 7/1948 | Moore | 180/19.1 |
| 2,566,177 A | * | 8/1951 | Eustis | 474/117 |
| 2,737,822 A | * | 3/1956 | Morse | 74/98 |
| 2,989,125 A | * | 6/1961 | Hoppenworth | 416/130 |
| 3,226,853 A | * | 1/1966 | Kamlukin | 37/244 |
| 3,396,590 A | * | 8/1968 | Verdery, Jr. | 474/5 |
| 3,477,439 A | * | 11/1969 | Zurek et al. | 180/366 |
| 3,722,277 A | * | 3/1973 | Fell et al. | 474/5 |
| 3,728,905 A | * | 4/1973 | Fell et al. | 474/5 |
| 3,938,400 A | * | 2/1976 | Konyha | 474/5 |
| 3,939,723 A | * | 2/1976 | Helm | 474/58 |
| 3,945,262 A | * | 3/1976 | Griffin | 474/58 |
| 4,023,429 A | * | 5/1977 | Davies, III | 474/135 |
| 4,063,609 A | * | 12/1977 | Kincaid | 180/246 |
| 4,132,121 A | * | 1/1979 | Clarke | 474/27 |
| 4,301,902 A | * | 11/1981 | Gatsos et al. | 192/219 |
| 4,455,811 A | * | 6/1984 | Beugelsdyk | 56/10.8 |

(Continued)

FOREIGN PATENT DOCUMENTS

EP 0 564 221 A1 10/1993

(Continued)

*Primary Examiner* — Michael Mansen
*Assistant Examiner* — Henry Liu
(74) *Attorney, Agent, or Firm* — Arent Fox LLP

(57) ABSTRACT

A power transmission device is capable of switching the rotation direction of a drive shaft between positive rotation and negative rotation as power is transmitted to the drive shaft from a drive source via the power transmission device. To cause positive rotation of the drive shaft, only the positive rotation belt is tensed by the belt switching means, and rotation from the positive rotation drive pulley is transmitted to the drive shaft via the positive rotation shaft. To cause negative rotation of the drive shaft, only the negative rotation belt is tensed by the belt switching means, and rotation from the negative rotation drive pulley is transmitted to the drive shaft via the negative rotation shaft.

5 Claims, 18 Drawing Sheets

U.S. PATENT DOCUMENTS

| | | | |
|---|---|---|---|
| 4,577,527 A * | 3/1986 | Shackelford | 74/640 |
| 4,696,661 A | 9/1987 | Rehlander | |
| 5,012,632 A * | 5/1991 | Kuhn et al. | 56/11.6 |
| 5,129,863 A * | 7/1992 | Boone et al. | 474/84 |
| 5,393,270 A * | 2/1995 | Grobbelaar | 474/5 |
| 7,252,027 B2 * | 8/2007 | Meredith et al. | 83/471.3 |
| 2006/0030447 A1 * | 2/2006 | Kita | 475/210 |

FOREIGN PATENT DOCUMENTS

| | | |
|---|---|---|
| EP | 1 894 456 A1 | 3/2008 |
| JP | 39-19711 U | 7/1964 |
| JP | 63-223207 A | 9/1988 |
| JP | 2001-202148 A | 7/2001 |
| JP | 2001-271926 A | 10/2001 |

\* cited by examiner

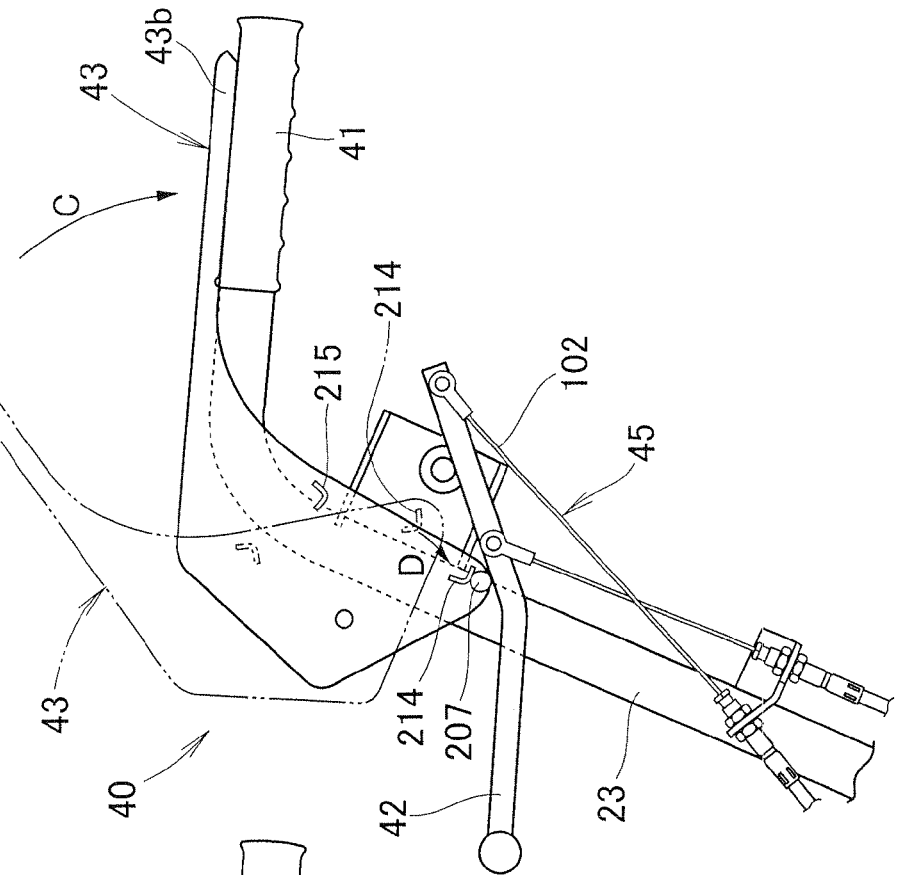
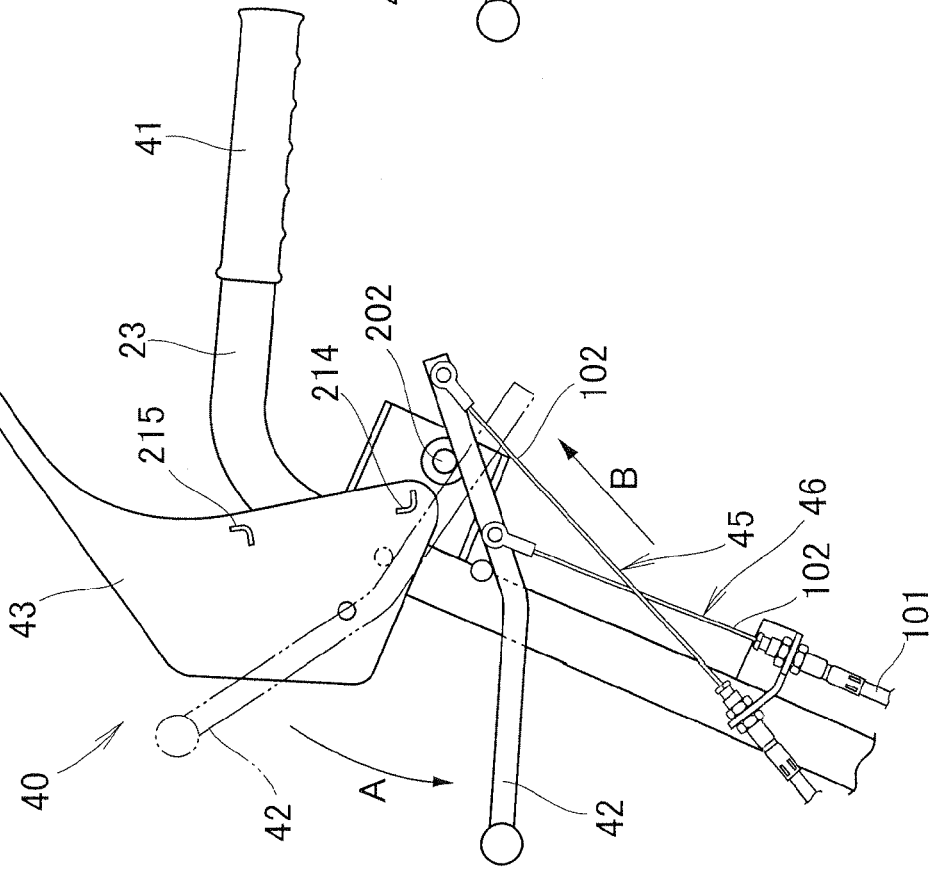
FIG.10A
FIG.10B

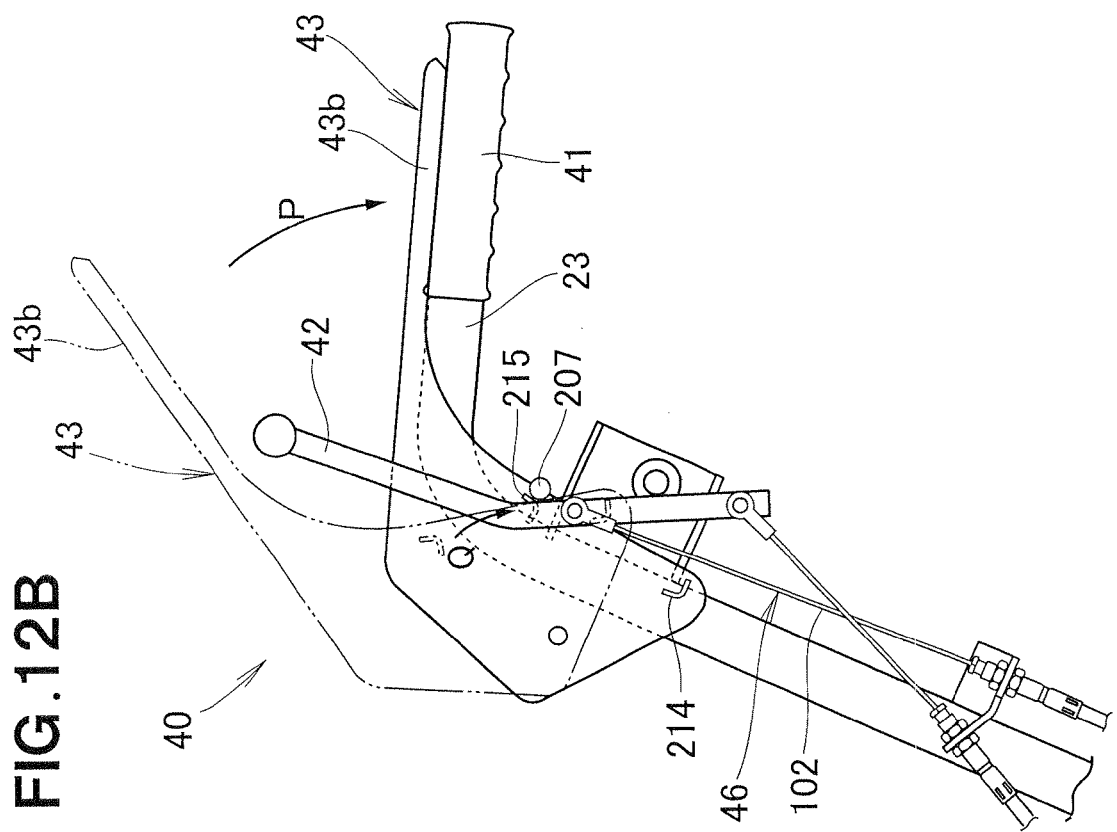
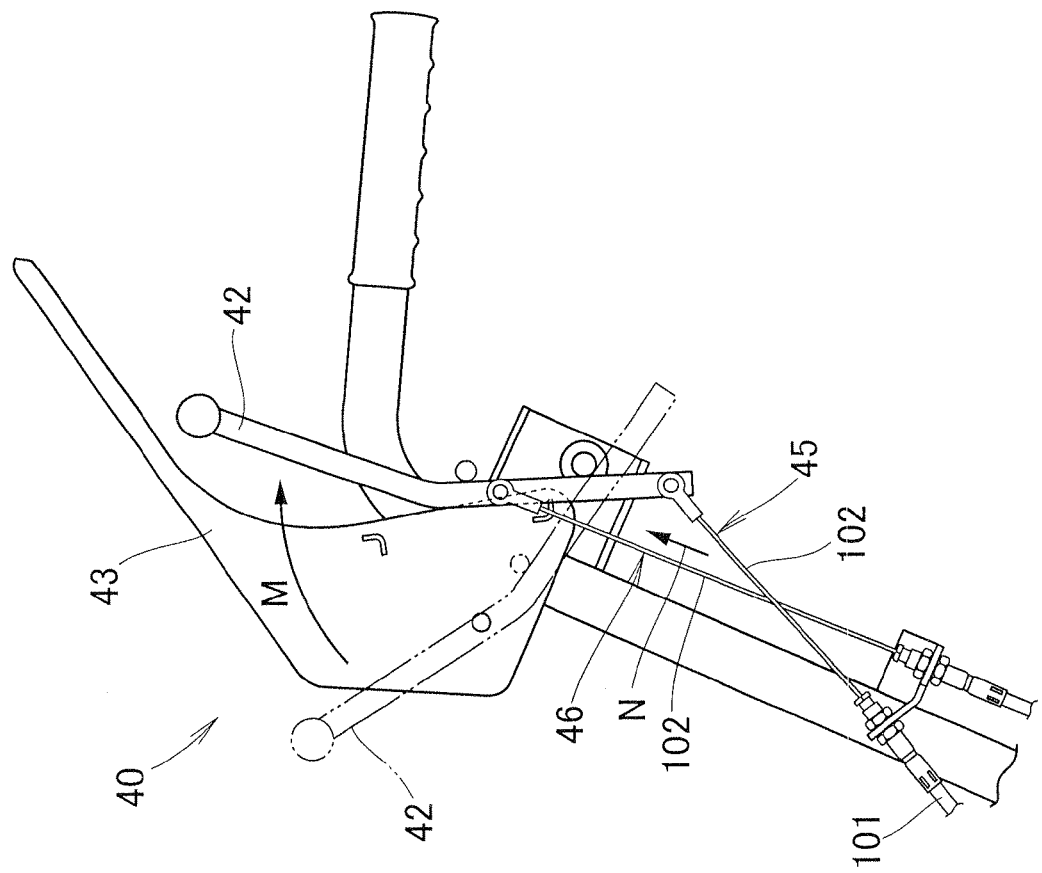

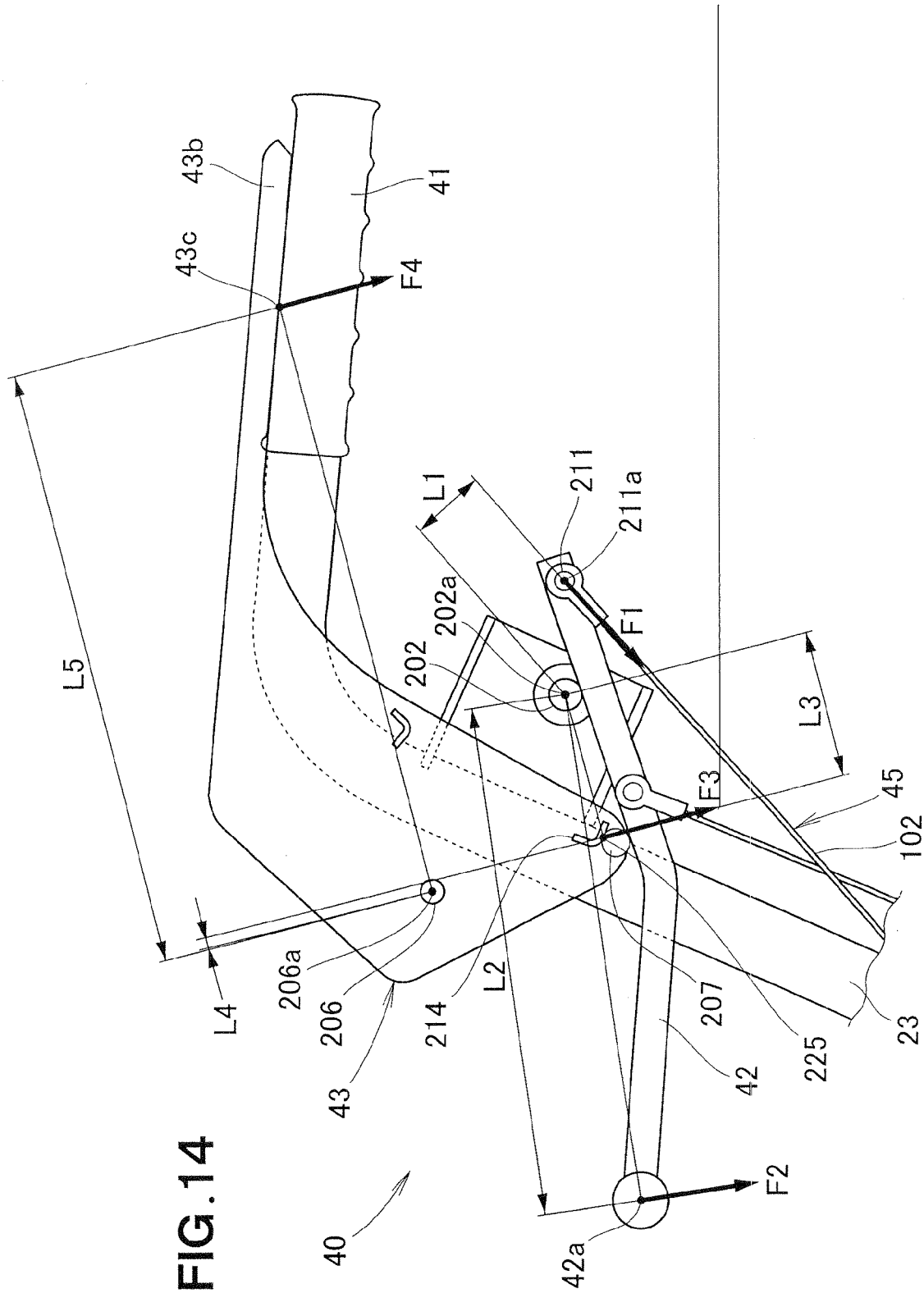

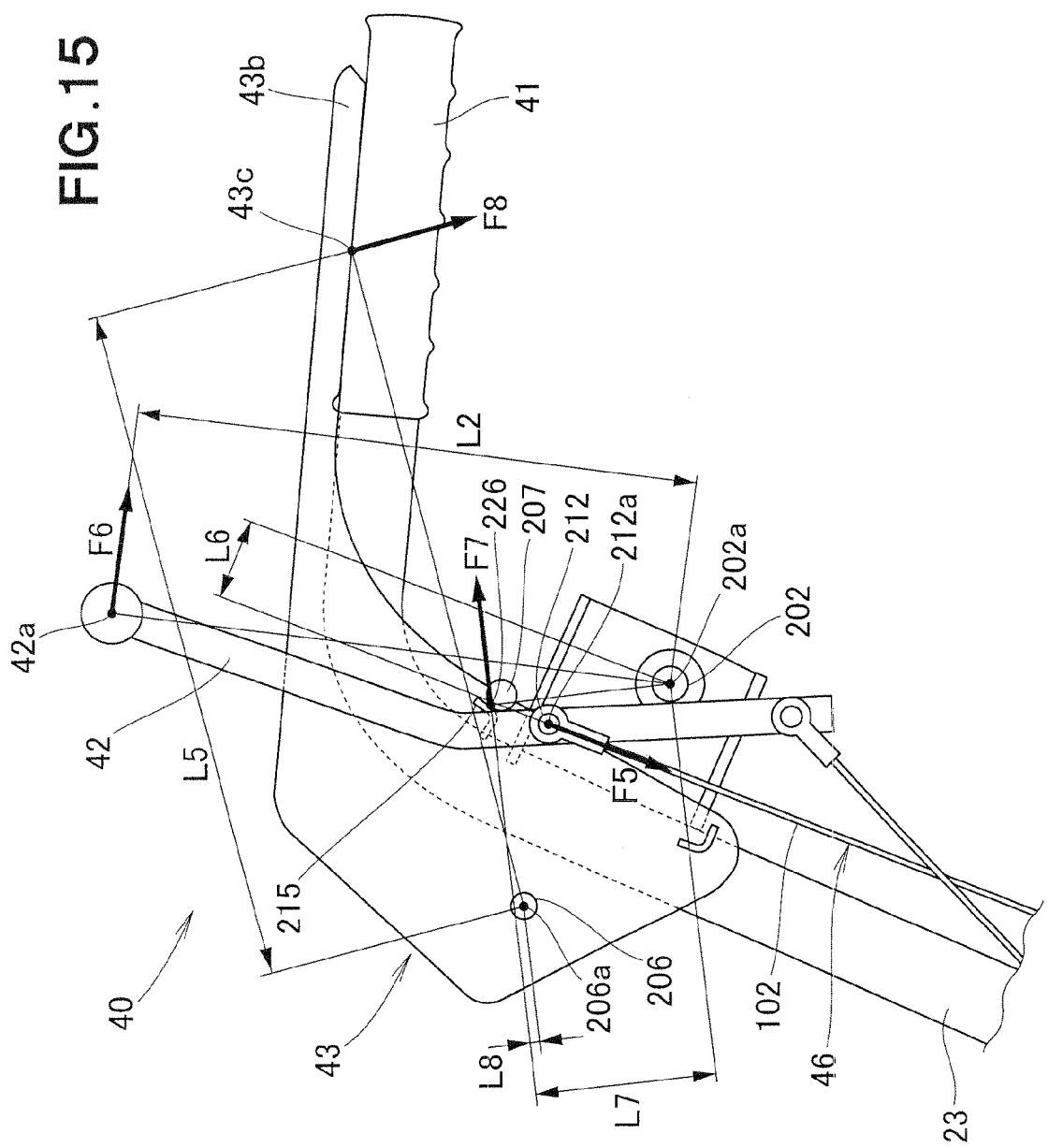

POWER TRANSMISSION DEVICE

FIELD OF THE INVENTION

The present invention relates to a power transmission device in which the rotation direction of a drive shaft is switched between positive rotation and negative rotation when power is transmitted to the drive shaft from an engine.

BACKGROUND OF THE INVENTION

A power transmission device in which a speed change device is coupled with an engine via a travel clutch is known from, for example, Japanese Patent Application Laid-Open Publication No. 63-223207 (JP 63-223207 A).

As disclosed in JP 63-223207 A, a drive pulley is attached to the output shaft of an engine mounted in a small-sized snow remover, a driven pulley is attached to the input shaft of the speed change device, and an endless V belt is trained around the drive pulley and the driven pulley.

A travel clutch is provided beside the V belt in order to engage and disengage the power transmitted to the speed change device from the engine. The travel clutch is provided with a roller capable of pushing against the V belt.

The endless V belt is trained around the drive pulley and the driven pulley in a slackened state. In this state, power is not transmitted to the input shaft of the speed change device from the output shaft of the engine, but when the roller presses against the endless V belt, the endless V belt tightens, and power is transmitted from the drive pulley to the driven pulley.

In the speed change device, the meshing of speed change gears is switched by operating a shift lever to allow forward, reverse, and neutral modes to be selected. When a mode other than neutral is selected, the meshing of a predetermined speed change gear and connection of the travel clutch occur simultaneously in conjunction with the operation of the shift lever.

In the small-sized snow remover disclosed in Japanese Laid-open Patent Publication No. 63-223207, there is a need particularly for cost reduction, a speed change device provided with a plurality of gears in which high-precision components are required is difficult to employ, and a speed change device having a simple structure is needed. For example, the mechanism for switching between forward and reverse travel in the speed change device is preferably simple, but the ability to smoothly switch between forward and reverse is also necessary. Cost can also be further reduced if the travel clutch similarly has a simple structure.

There are also instances in which the small-sized snow remover is pushed or pulled, or moved in different directions by hand without the aid of the drive power of the small-sized snow remover according to conditions in the location where snow is removed, for example. The ability to set/maintain the neutral state of the speed change device by a simple structure is needed for the sake of convenience, so that the small-sized snow remover can be made to change direction or move merely by human power.

A forward-reverse switching lever provided to a steering handle is known as a forward-reverse switch operating mechanism, as disclosed in Japanese Patent Application Laid-Open Publication No. 2001-271926 (JP 2001-271926 A).

According to the forward-reverse switch operating mechanism disclosed in JP 2001-271926 A, a forward-reverse switching lever for switching the forward and reverse travel of a binder is provided to the steering handle of a binder.

This forward-reverse switching lever is normally held in an upright position, and forward travel is achieved by pushing the lever forward from the upright position, and reverse travel is achieved by pushing the lever backward from the upright position.

Since a locking mechanism for retaining the lever in the forward or reverse position is not provided to the forward-reverse switching lever described above, the operator must directly maintain the forward-reverse switching lever in the forward position or the reverse position by hand while the binder is traveling forward or backward.

Particularly when the lever is in the forward position, the operator must maintain a posture in which the hand is extended a long distance forward, and this places a significant burden on the operator. There is a need to reduce the retaining force if possible, and such an enhancement is also needed for operability.

Furthermore, the structure for coupling the forward-reverse switching lever and two operating cables together is complex, and the cost involved creates a need for a simplified structure.

Furthermore, when the forward-reverse switching lever is in the forward position or the reverse position, one of the operating cables is in a slackened state, and can interfere with operation.

SUMMARY OF THE INVENTION

It is therefore an object of the present invention to provide a power transmission device whereby it is possible to smoothly switch between forward and reverse travel and whereby a neutral state can be set and maintained by a simple structure.

According to the present invention, there is provided a power transmission device capable of switching the rotation direction of a drive shaft between positive rotation and negative rotation when power is transmitted to the drive shaft from a drive source via the power transmission device, and the power transmission device comprising: a positive rotation drive pulley and a negative rotation drive pulley that are coupled with an output shaft of the drive source; a positive rotation shaft coupled with the drive shaft via a positive rotation gear train; a positive rotation driven pulley attached to the positive rotation shaft; a positive rotation endless belt trained around the positive rotation drive pulley and the positive rotation driven pulley; a negative rotation shaft coupled with the drive shaft via a negative rotation gear train; a negative rotation driven pulley attached to the negative rotation shaft; a negative rotation endless belt trained around the negative rotation drive pulley and the negative rotation driven pulley; belt switching means for switching the power-transmitting belt between the positive rotation endless belt and the negative rotation endless belt by tensing only one of the positive rotation endless belt and negative rotation endless belt; and neutral state maintaining means for maintaining a neutral state in which power transmission by both of the positive rotation endless belt and the negative rotation endless belt is interrupted, by slackening both the positive rotation endless belt and the negative rotation endless belt.

To cause positive rotation of the drive shaft, only the positive rotation endless belt is tensed by the belt switching means. Power is thereby transmitted to the positive rotation driven pulley via the positive rotation endless belt from the positive rotation drive pulley coupled with the output shaft of the drive source, power is also transmitted to the drive shaft via the positive rotation gear train from the positive rotation shaft attached to the positive rotation driven pulley, and the drive shaft rotates positively.

To cause negative rotation of the drive shaft, only the negative rotation endless belt is tensed by the belt switching means. Power is thereby transmitted to the negative rotation driven pulley via the negative rotation endless belt from the negative rotation drive pulley coupled with the output shaft of the drive source, power is also transmitted to the drive shaft via the negative rotation gear train from the negative rotation shaft attached to the negative rotation driven pulley, and the drive shaft rotates negatively.

The belt switching means enables the negative rotation endless belt to be slackened from a tensed state at the same time that the positive rotation endless belt is tensed from a slackened state, or the negative rotation endless belt to be tensed from a slackened state at the same time that the positive rotation endless belt is slackened from a tensed state. The belt switching means also makes it possible for the drive shaft to smoothly switch between positive and negative rotation, and for the clutch to engage at the same time such a switch occurs between positive and negative rotation. Consequently, there is no need for a speed change device in which a plurality of gears is provided and high-precision components are required, or for a travel clutch or the like having numerous components, such as in conventional techniques.

Furthermore, it is also possible to set a neutral state in which the coupling between the drive shaft and the output shaft of the drive source is interrupted, as a state in which the positive rotation endless belt and the negative rotation endless belt are both slackened, at an intermediate point of switching between positive and negative rotation of the drive shaft. The neutral state maintaining means also enables the abovementioned neutral state to be maintained, and the drive shaft can be freely rotated without being bound by the output shaft of the drive source. Therefore, in a case in which the operator uses his hand to push or pull, for example, a small-sized snow remover or the like configured so that, for example, wheels, crawler belts, or another travel means is attached to the drive shaft, the travel means rotates easily, and a general-purpose machine can therefore be easily pushed or pulled.

Preferably, the belt switching means is coupled with a forward-reverse switch operating mechanism provided in the vicinity of a handle of a travel implement in order to effect positive rotation or negative rotation of the drive shaft, the forward-reverse switch operating mechanism having: a forward-reverse switching lever for switching between forward and reverse travel of the travel implement according to the direction of tipping from a neutral position, the forward-reverse switching lever being urged to the neutral position; and a locking lever for causing the forward-reverse switching lever to be retained in the switch positions of forward and reverse travel by pushing the forward-reverse switching lever toward the handle.

To cause forward travel of the travel implement, the forward-reverse switching lever is tipped from the neutral position to the forward switch position, the locking lever is then pushed against the side of the handle, and the forward-reverse switching lever is retained in the forward switch position.

To cause reverse travel of the travel implement, the forward-reverse switching lever is tipped from the neutral position to the reverse switch position, the locking lever is then pushed against the side of the handle, and the forward-reverse switching lever is retained in the reverse switch position.

Compared to maintaining the forward-reverse switching lever in the forward or reverse switch position simply by hand, the configuration for maintaining the forward-reverse switching lever in the forward or reverse switch position via a locking lever increases the degree of freedom of arm length between the forward-reverse switching lever and the locking lever, and makes it possible to reduce the retaining force.

The locking lever is thus added to the forward-reverse switching lever by a simple structure, and since the forward-reverse switching lever is maintained in the forward switch position or the reverse switch position by the same operation as that by which the locking lever is pushed against the side of the handle, operation is also simplified.

Desirably, the locking lever has lock pieces for maintaining the forward and reverse switch positions of the forward-reverse switching lever by making contact with a lock-receiving piece provided to the forward-reverse switching lever.

The forward-reverse switching lever is placed in a state of retention by the locking lever by the lock piece provided to the locking lever coming in contact with the lock-receiving piece provided to the forward-reverse switching lever. The forward and reverse switch positions of the forward-reverse switching lever can thus be reliably maintained by the simple structure of the locking lever, the cost of the locking lever can be reduced, and reliability can be increased.

In a preferred form, the forward-reverse switching lever is coupled with operating cables via a coupler, and the coupler is formed by rings having elongated holes in which coupled ends of the operating cables are able to move.

When the forward-reverse switching lever is tipped, and an operating cable changes from a tensed state to a slackened state, the coupled end of the operating cable moves in the elongated hole of the ring, the ring as such oscillates, the slack in the operating cable can be accommodated, and the cable can be made less prone to slackening. The operating cable consequently does not interfere with operation.

BRIEF DESCRIPTION OF THE DRAWINGS

Certain preferred embodiments of the present invention will be described in detail below, by way of example only, with reference to the accompanying drawings, in which:

FIGS. 10A and 10B are views showing a state in which the forward-reverse switching lever of the forward-reverse switch operating mechanism of FIG. 9 is tipped forward from the neutral position;

FIGS. 12A and 12B are schematic views showing a state in which the forward-reverse switching lever of the forward-reverse switch operating mechanism is tipped backward from the neutral position;

FIG. 14 is a view showing the state of balance between the forward-reverse switching lever and the locking lever when the forward-reverse switching lever of the forward-reverse switch operating mechanism is tipped forward;

FIG. 15 is a view showing the state of balance between the forward-reverse switching lever and the locking lever when the forward-reverse switching lever of the forward-reverse switch operating mechanism is tipped backward;

DETAILED DESCRIPTION OF THE PREFERRED EMBODIMENTS

Figure 1:
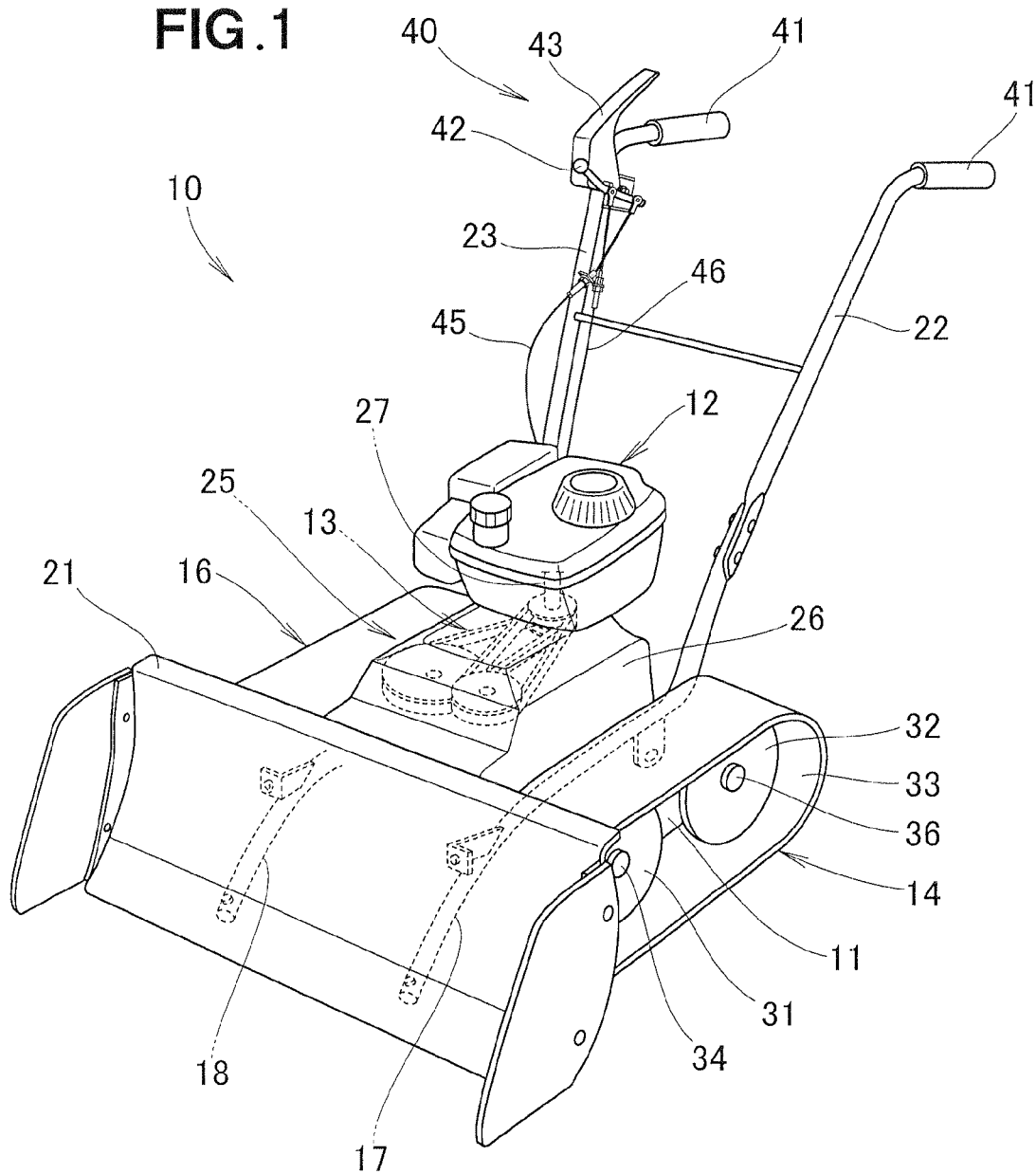
FIG. 1 is a perspective view showing a small-sized snow remover employing a forward-reverse switch operating mechanism and a power transmission device according to the present invention.

In the small-sized snow remover 10 shown in FIG. 1, the following units are mounted on a chassis 11: an engine 12; a speed change device 13 for transmitting the power of the engine 12 and switching the forward and reverse travel of the small-sized snow remover 10; left and right crawler travel units 14, 16 connected to the output side of the speed change device 13; left and right swing pipes 17, 18 provided to the chassis 11 so as to be able to swing; a snow plow 21 for snow removal attached to the front ends of the swing pipes 17, 18; and left and right handles 22, 23 attached to the rear ends of the swing pipes 17, 18. Power from the engine 12 is transmitted to the left and right crawler travel units 14, 16 via a power transmission device 25. The speed change device 13 is covered by a cover 26.

The engine 12 is a vertical engine provided with a vertically oriented crankshaft 27.

The left crawler travel unit 14 has a drive wheel 31 provided to the rear of the snow plow 21, a free wheel 32 provided to the rear of the drive wheel 31, a crawler belt 33 that extends between the drive wheel 31 and the free wheel 32, a travel shaft 34 coupled with the speed change device 13 and attached to the drive wheel 31, and a driven shaft 36 for supporting the free wheel 32 so as to allow the free wheel 32 to rotate.

The right crawler travel unit 16 is left-right symmetrical to the left crawler travel unit 14 and has the same basic structure as the left crawler travel unit 14, and therefore will not be described in detail.

A grip 41 is provided to the end of each of the handles 22, 23. The right-side handle 23 is provided with a forward-reverse switching lever 42 for switching between forward and reverse travel of the small-sized snow remover 10, and a locking lever 43 for locking the forward-reverse switching lever 42.

The forward-reverse switching lever 42 and the locking lever 43 constitute a forward-reverse switch operating mechanism 40. A first operating cable 45 and a second operating cable 46 connect the speed change device 13 and the forward-reverse switching lever 42 in order to switch between forward and reverse travel.

Figure 2:
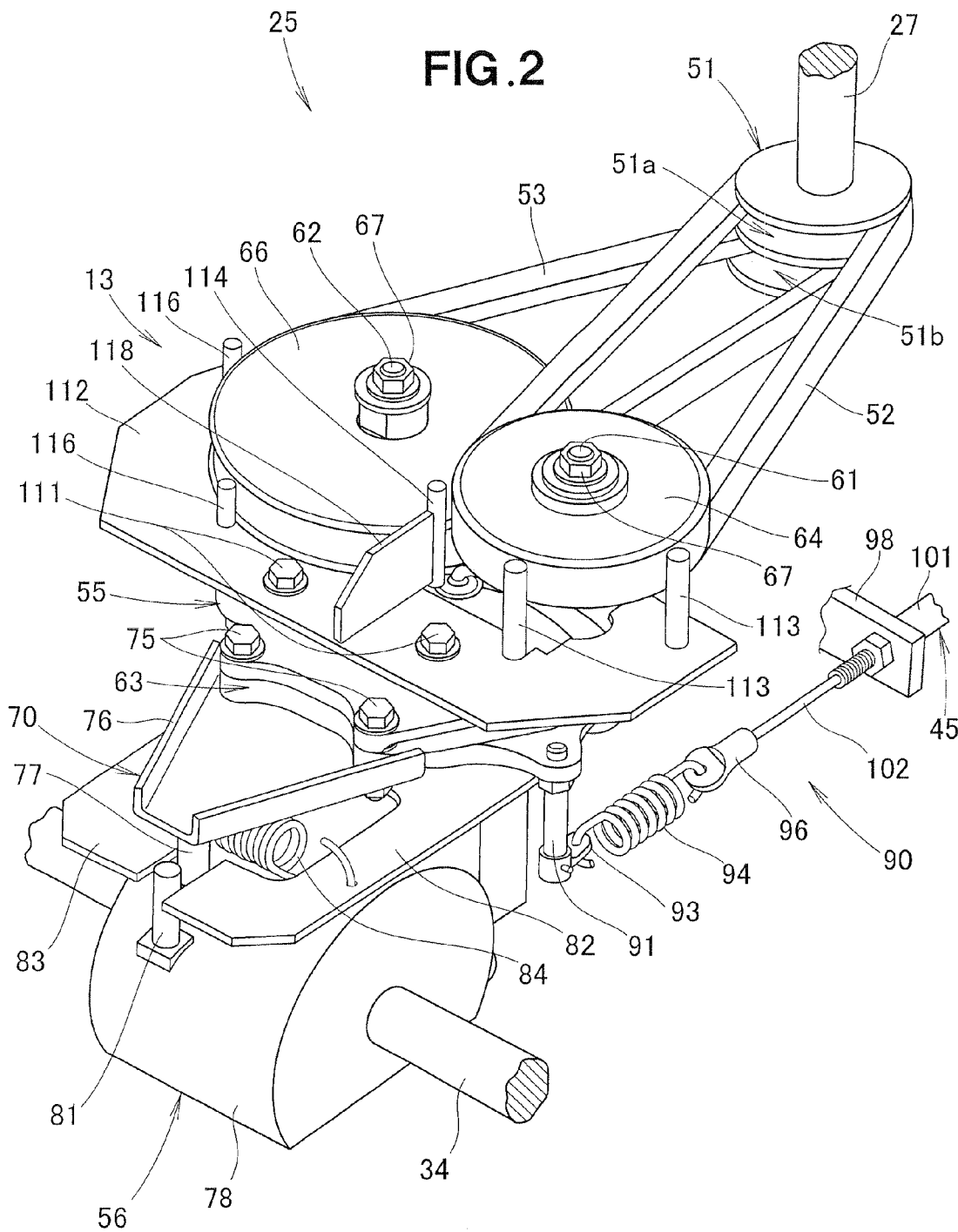
FIG. 2 is a perspective view showing the power transmission device of FIG. 1.

As shown in FIG. 2, the power transmission device 25 has a drive pulley 51 attached to the bottom end of the crankshaft 27 of the engine 12 (FIG. 1), two belts that include a first V belt (positive rotation endless belt) 52 and a second belt (negative rotation endless belt) 53 that are mounted on the drive pulley 51, and the speed change device 13 coupled with the drive pulley 51 via the first and second V belts 52, 53.

The speed change device 13 is provided with an upper speed change unit 55 coupled with the first and second V belts 52, 53, and a lower speed change unit 56 disposed below the upper coupler 55.

The upper speed change unit 55 is attached so as to be able to rotate about a vertically extending drive shaft (see FIGS. 3 and 5) provided to the lower speed change unit 56.

The lower speed change unit 56 is attached to the chassis 11 (FIG. 1) and coupled with the travel shaft 34.

In the drive pulley 51, a first drive pulley (positive rotation drive pulley) 51a on which the first V belt 52 is mounted, and a second drive pulley (negative rotation drive pulley) 51b on which the second V belt 53 is mounted are integrally formed.

In the upper speed change unit 55, two shafts that include a first input shaft (positive rotation shaft) 61 and a second input shaft (negative rotation shaft) 62 are attached vertically to an upper speed change unit case 63 so as to be able to rotate, a first pulley (positive rotation driven pulley) 64 and a second pulley (negative rotation driven pulley) 66 are attached by nuts 67 to the upper ends of the first input shaft 61 and the second input shaft 62, respectively, the first V belt 52 is mounted on the first pulley 64, and the second V belt 53 is mounted on the second pulley 66.

A neutral maintaining mechanism 70 for maintaining the position of the upper speed change unit 55 in the rotation direction thereof with respect to the lower speed change unit 56 in a predetermined position is provided to the front part of the upper speed change unit 55.

The neutral maintaining mechanism 70 has a bracket 76 attached by bolts 75, 75 to the front of the upper speed change unit case 63; an upper speed change unit positioning pin 77 attached to the distal end part of the bracket 76 so as to extend downward; a retaining position pin 81 attached to the front of a lower speed change unit case 78 of the lower speed change unit 56 so as to extend upward; left and right retaining plates 82, 83 in which one end of each thereof is rotatably attached to the bottom of the upper speed change unit 55, and the other ends thereof are on either side of the upper speed change unit positioning pin 77 and the retaining position pin 81; and a tension coil spring 84 attached between the retaining plates 82, 83.

The predetermined position maintained by the neutral maintaining mechanism 70 is a neutral position in which both the first and second V belts 52, 53 slacken and no longer transmit power, and when the upper speed change unit 55 is rotated, the upper speed change unit 55 is returned to the predetermined position by the elastic force of the tension coil spring 84 and maintained in this neutral position.

The rotation mechanism (belt switching means) 90 for causing the upper speed change unit 55 to rotate has a left-right pair of rotation pins 91, 92 (see FIG. 3) attached to the left and right ends of the upper speed change unit case 63 so as to extend downward; attachment pieces 93, 93 (only the reference numeral 93 for the attachment piece in front is shown) coupled in sequence with the rotation pins 91, 92; tension coil springs 94, 94 (only the reference numeral 94 for the tension coil spring in front is shown), wire end members 96, 96 (only the reference numeral 96 for the wire end member in front is shown), the first and second cables 45, 46 (FIG. 1); the forward-reverse switching lever 42 (FIG. 1); and the locking lever 43 (FIG. 1).

The first operating cable 45 has an outer cable 101, one end of which is supported by a cable support stay 98 provided to the chassis 11 (FIG. 1); and an inner wire 102 inserted so as to be able to move inside the outer cable 101, and attached at one end to a wire end member 96. The second cable 46 has the same structure as the first cable 45, and will not be described.

A flat panel 112 is attached by a plurality of bolts 111 to the upper part of the upper speed change unit case 63, and belt unseating prevention pins 113, 113, 114, 116, 116 for preventing the first and second V belts 52, 53 from coming off the first pulley 64 and second pulley 66 are provided on the flat panel 112. The unseating prevention pin 114 is attached to the flat panel 112 via an auxiliary plate 118.

The speed change device 13 has the upper speed change unit 55; the lower speed change unit 56; the rotation mechanism 90 for causing the upper speed change unit 55 to rotate and switching between a tensed state and a slackened state of the first and second V belts 52, 53; and the neutral maintaining mechanism 70 for placing both the first and second V belts 52, 53 in a state in which power is not transmitted, by maintaining both the first and second V belts 52, 53 in a slackened state.

Figure 3:
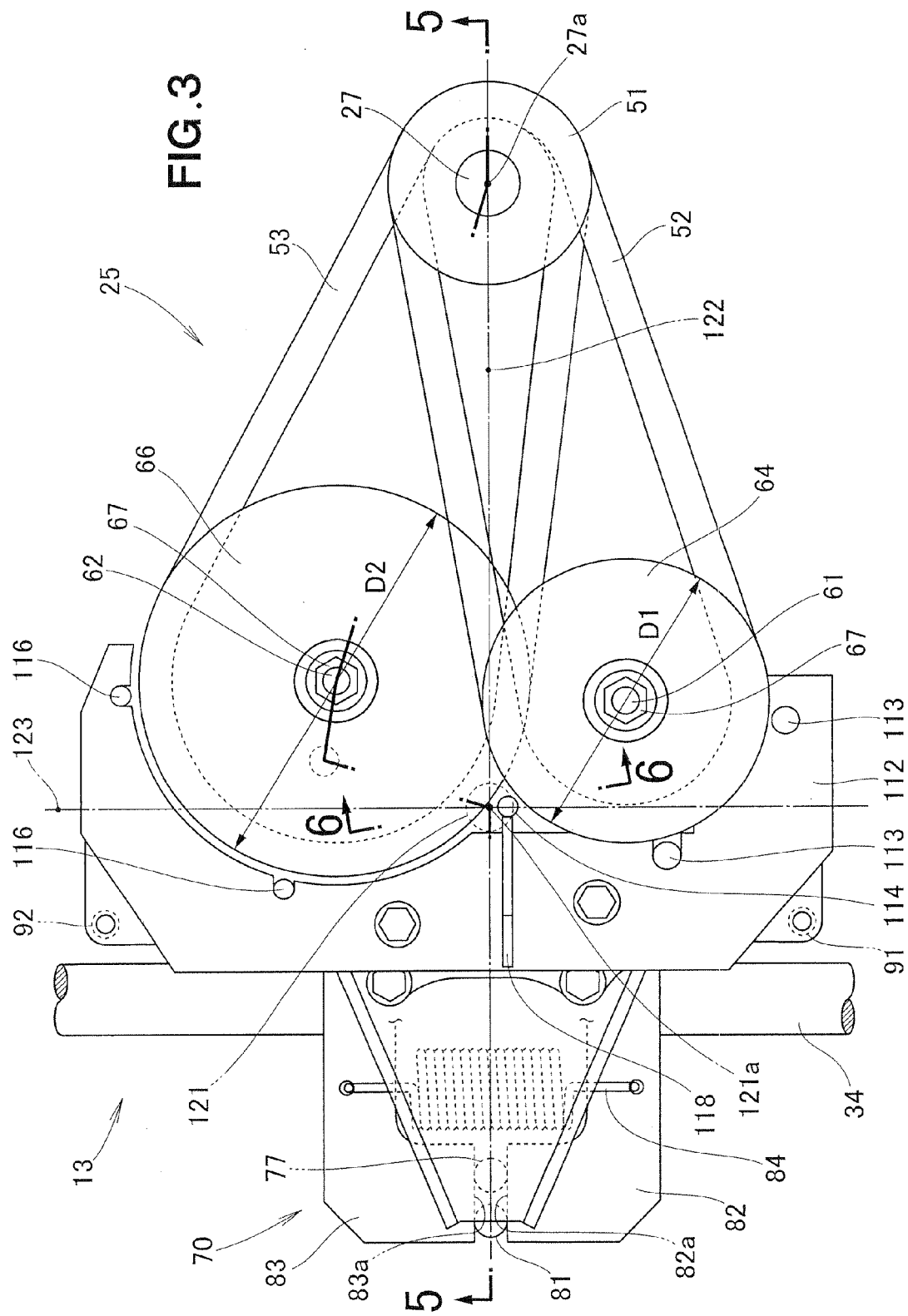
FIG. 3 is a top plan view showing the power transmission device of FIG. 2.

As shown in FIG. 3, a center line 122 that extends in the front-rear direction of the small-sized snow remover passes through an axis line 27a of the engine crankshaft 27 and an axis line 121a of a drive shaft 121 provided to the lower speed change unit 56 (FIG. 2). The first input shaft 61 is positioned on the left side of the center line 122, and the second input shaft 62 is positioned on the right side of the center line 122. Designating the outside diameters of the first pulley 64 attached to the first input shaft 61, and the second pulley 66 attached to the second input shaft 62 as D1 and D2, respectively, the outside diameter D2 of the second pulley 66 is larger than the outside diameter D1 of the first pulley 64. The reference numeral 123 refers to a reference line that passes through the drive shaft 121 and the axis line 121a and is orthogonal to the center line 122.

The second pulley 66 is a component for transmitting power when the small-sized snow remover is traveling in reverse. The reason that the second pulley 66 is fashioned to a larger diameter than is the first pulley 64, which is used to transmit power for forward travel, is to increase the speed reduction ratio beyond that of the first pulley 64 and to cause the small-sized snow remover to travel at a slower speed when in reverse than when in forward travel.

The upper speed change unit positioning pin 77 and the retaining position pin 81 that constitute the maintaining mechanism 70 are arranged along the center line 122 in the forward-rear direction, and are held between pinching surfaces 82a, 83a of the retaining plates 82, 83 by the elastic force of the tension coil spring 84.

Since the retaining position pin 81 is fixed to the lower speed change unit 56 (FIG. 2), even when the upper speed change unit positioning pin 77 tends to rotate along with the rotation of the upper speed change unit 55, the upper speed change unit positioning pin 77 is returned to the center line 122 by the elastic force of the tension coil spring 84, and is maintained on the center line 122.

Figure 4:
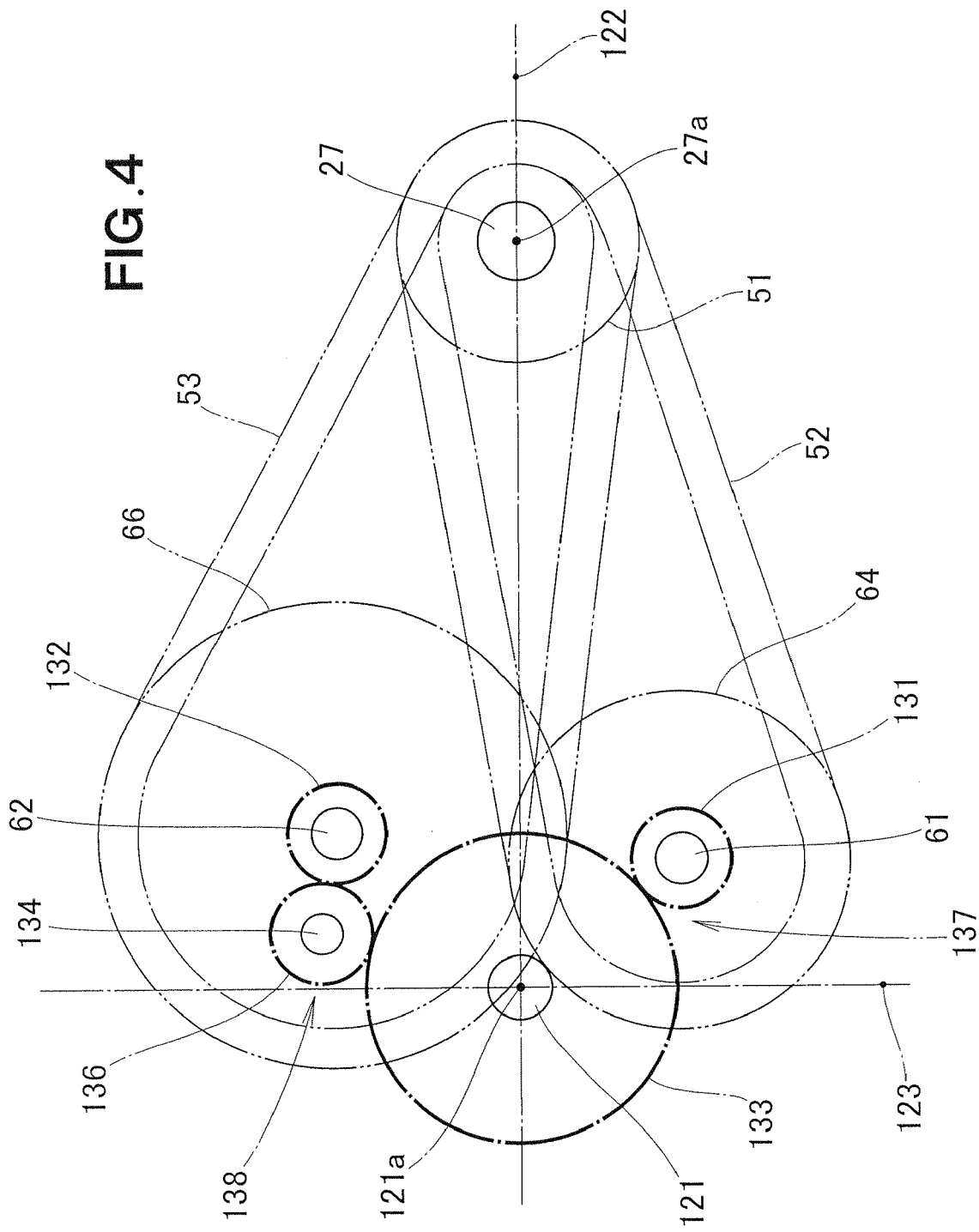
FIG. 4 is a schematic view showing a power transmission path of the power transmission device of FIG. 3.

As shown in FIG. 4, a first drive gear 131, a second drive gear 132, and a driven gear 133 are attached to the first input shaft 61, the second input shaft 62, and the drive shaft 121, respectively. The first drive gear 131 and the second drive gear 132 each have the same number of teeth.

The first drive gear 131 directly meshes with the driven gear 133. The second drive gear 132 meshes with the driven gear 133 via an idle gear 136 that is rotatably attached to an idle shaft 134. The number of teeth of the idle gear 136 is the same as the number of teeth of the first drive gear 131 and the second drive gear 132.

The idle shaft 134 is attached to the upper speed change unit case 63 (FIG. 3) and is positioned in front of the second input shaft 62 and to the rear of the drive shaft 121.

The first drive gear 131 and the driven gear 133 constitute a first gear train (positive rotation gear train) 137 for positively rotating the drive shaft 121. The second drive gear 132, the idle gear 134, and the driven gear 133 constitute a second gear train (negative rotation gear train) 138 for negatively rotating the drive shaft 121.

During forward travel of the small-sized snow remover, the power of the engine is transmitted in the following sequence: crankshaft 27→drive pulley 51→first V belt 52→first pulley 64→first input shaft 61→first drive gear 131→driven gear 133→drive shaft 121. Specifically, the engine power is transmitted from the first input shaft 61 to the drive shaft 121 via the first gear train 137.

During reverse travel of the small-sized snow remover, the power of the engine is transmitted in the following sequence: crankshaft 27→drive pulley 51→second V belt 53→second pulley 66→second input shaft 62→second drive gear 132→idle gear 136→driven gear 133→drive shaft 121. Specifically, the engine power is transmitted from the second input shaft 62 to the drive shaft 121 via the second gear train 138.

Figure 5:
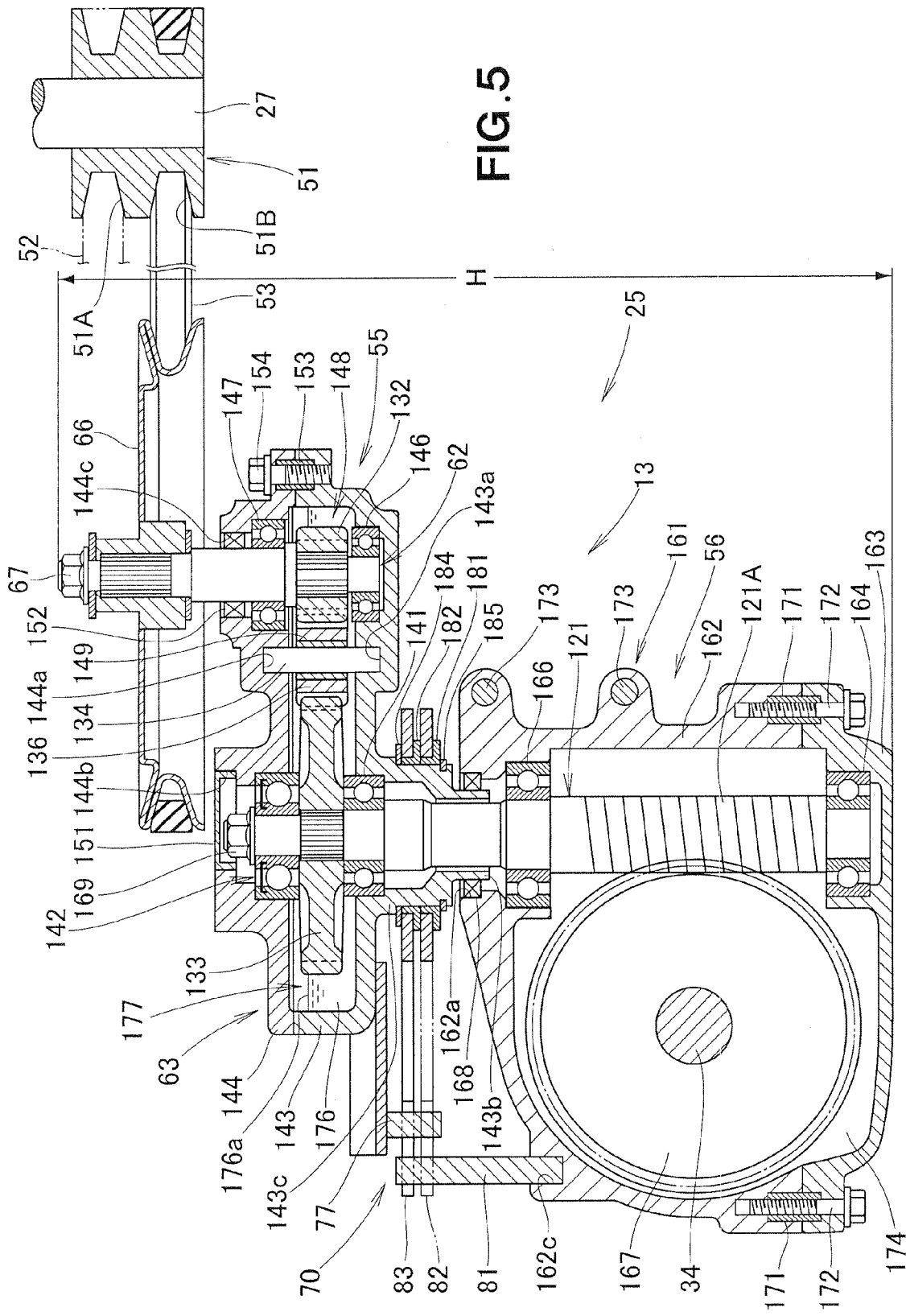
FIG. 5 is a sectional view taken along line 5-5 of FIG. 3.

As shown in FIG. 5, the power transmission device 25 has the drive pulley 51, the first and second V belts 52, 53, and the speed change device 13 that is driven by the V belts 52, 53.

The speed change device 13 has the upper speed change unit 55, the lower speed change unit 56, the maintaining mechanism 70, and the rotation mechanism 90 (FIG. 2), and is capable of switching the forward and reverse travel of the small-sized snow remover and being set to a neutral state (state in which power is not transmitted to the drive shaft 121).

The upper speed change unit 55 has the upper speed change unit case 63 (which has a lower case 143 and an upper case 144 that is attached to the top of the lower case 143) attached to the drive shaft 121 via two bearings 141, 142 so as to be able to rotate; the second input shaft 62 attached to the upper speed change unit case 63 via two bearings 146, 147 so as to be able to rotate; the first input shaft 61 (FIG. 3) attached to the upper speed change unit case 63 via the two bearings 146, 147 so as to be able to rotate; the idle shaft 134 inserted into insertion holes 143a, 144a that are formed in the lower case 143 and upper case 144, respectively, of the upper speed change unit case 63; the first drive gear 131 (FIG. 4) coupled with each of the first input shaft 61 by using splines, the second input shaft 62, and the drive shaft 121 and positioned in a space 148 inside the upper speed change unit case 63; the idle gear 136 attached to the second drive gear 132, the driven gear 133, and the idle shaft 134 via a bushing 149 so as to be able to rotate; and the first pulley 64 (FIG. 3) and second pulley 66 coupled with the first input shaft 61 and the second input shaft 62, respectively, by using splines.

The reference numeral 151 refers to a cap for blocking an opening 144b that is formed in the upper case 144 above the drive shaft 121. The reference numeral 152 refers to a seal member provided between the second input shaft 62 and an opening 144c on the side of the upper case 144. The reference numeral 153 refers to a collar for positioning the lower case 143 and the upper case 144 with respect to each other. The reference numeral 154 refers to a bolt for fastening together the lower case 143 and the upper case 144.

The lower speed change unit 56 has a lower speed change unit case 161 (which has a case main body 162 and a cover member 163 for blocking an opening provided in the bottom of the case main body 162); the drive shaft 121 attached to the lower speed change unit case 161 via two bearings 164, 166 so as to be able to rotate; a worm wheel 167 for meshing with a worm 121A that is formed at the bottom of the drive shaft 121; and a seal member 168 provided between an upper opening 162a of the case main body 162 and a tube part 143b that is formed at the lower end of the lower case 143 of the upper speed change unit 55.

The worm wheel 167 is attached to the travel shaft 34 that is attached to the case main body 162 so as to be able to rotate. The reference numeral 169 refers to a nut that is screwed onto the upper end of the drive shaft 121, and the nut prevents the bearing 142 from coming off the drive shaft 121.

The reference numeral 171 refers to a collar for positioning the case main body 162 and the cover member 163 with respect to each other; 172 refers to a bolt for fastening together the case main body 162 and the cover member 163; 173 refers to a bolt for attaching the case main body 162 to the chassis 11 (see FIG. 1); 174 refers to a space inside the lower speed change unit case 161; 176 refers to lubrication oil held in a space 177 formed by the space 148 inside the upper speed change unit 55 and the space 174 inside the lower speed change unit 56; and 176a refers to the surface of the lubrication oil 176.

As described above, the upper speed change unit 55 is attached to the lower speed change unit 56 so as to be able to rotate in the speed change device 13, and the upper speed change unit 55 and the lower speed change unit 56 have a structure in which the tube part 143b of the upper speed change unit 55 is inserted into the upper opening 162a of the lower speed change unit 56, and a seal is formed between the upper opening 162a and the tube part 143b by the seal member 168. The number of components of the speed change device 13 can thereby be reduced, and the structure of the speed change device 13 can be simplified in comparison to a structure in which the upper speed change unit and the lower speed change unit are vertically separated from each other, and a seal member is provided to each of the upper speed change unit and the lower speed change unit, for example.

Overlapping the upper opening 162a of the lower speed change unit 56 and the tube part 143b of the upper speed change unit 55 with the axial direction of the drive shaft 121 enables the upper speed change unit 55 and the lower speed change unit 56 to be closer to each other, and makes it possible to further reduce the height H of the speed change device 13.

In the maintaining mechanism 70, the upper speed change unit positioning pin 77 extends further downward than the lower retaining plate 82, the retaining position pin 81 is pressed into an attachment hole 162c provided to the case main body 162 of the lower speed change unit 56, and extends further upward than the upper retaining plate 83, and the retaining plates 82, 83 are attached to a bottom cylindrical part 143c of the lower case 143 of the upper speed change unit 55 via plate receiving members 181, 182 so as to be able to rotate. The reference numeral 184 refers to a washer, and 185 refers to a retaining ring.

Figure 6:
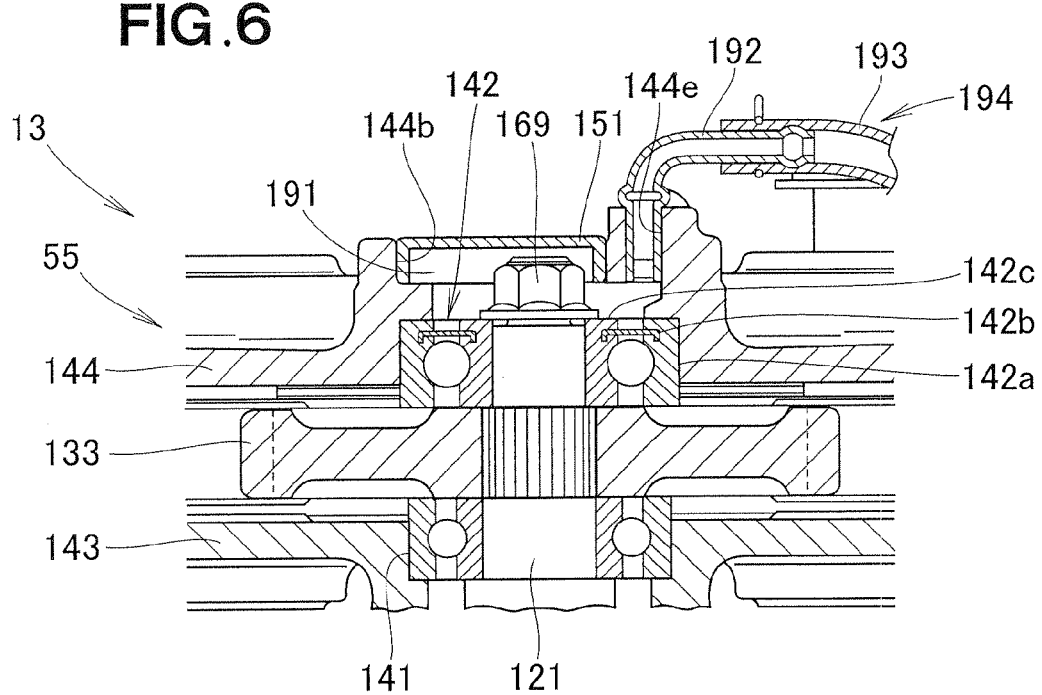
FIG. 6 is a sectional view taken along line 6-6 of FIG. 3.

As shown in FIG. 6, the inside of the upper end of the upper case 144 of the upper speed change unit 55, i.e., the space enclosed by the opening 144b of the upper case 144, the drive shaft 121, the bearing 142, the nut 169, and the cap 151, forms a breather chamber 191. One end of an L-shaped breather pipe 192 is pressed into a vertical hole 144e formed in the upper case 144; a breather hose 193 is connected to the other end of the breather pipe 192; and a breather passage 194 is formed by the breather pipe 192 and the breather hose 193.

Since the breather chamber 191 is adjacent to and above the bearing 142, a high temperature occurs in the breather chamber 191 as the temperature of the bearing 142 increases during rotation of the drive shaft 121, and the pressure also increases, but the breather chamber 191 and the outside of the speed change device 13 are communicated with each other by the breather passage 194, and the temperature and pressure inside the breather chamber 191 can thereby be reduced.

The bearing 142 is a sealed bearing, a sealed plate 142b is fixed to an outer ring 142a, a labyrinth gap is formed by the sealed plate 142b and a groove formed in the seal surface of an inner ring 142c, and dust and the like is prevented from penetrating into the sliding part of the bearing 142.

Figure 7:
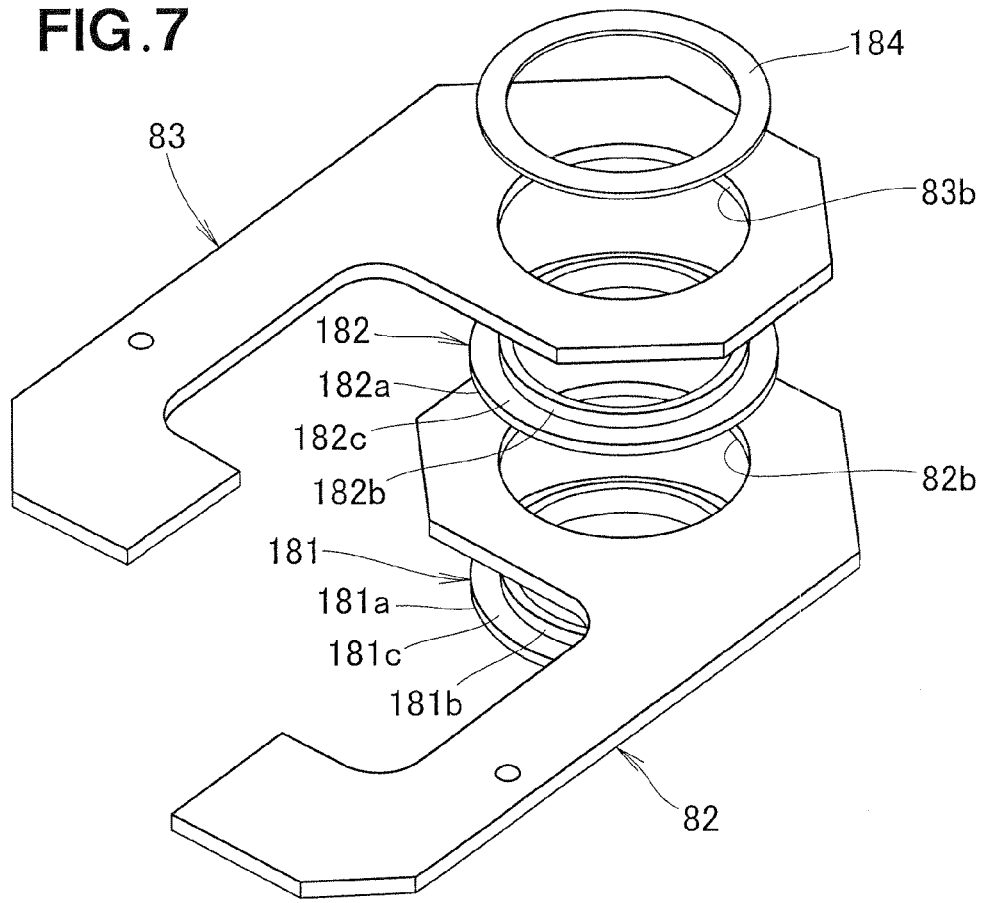
FIG. 7 is a perspective view showing left and right retention plates shown in FIG. 3.

As shown in FIG. 7, the left and right retaining plates 82, 83 are provided with plate hole parts 82b, 83b, respectively, and the plate receiving members 181, 182 have large-diameter parts 181a, 182a and small-diameter parts 181b, 182b, respectively, and step parts 181c, 182c that are provided between the large-diameter parts 181a, 182a and the small-diameter parts 181b, 182b, respectively.

The left retaining plate 82 is mounted on the step part 181c of the plate receiving member 181, and the plate hole part 82b is rotatably fitted into the small-diameter part 181a of the plate receiving member 181. In the same manner, the right retaining plate 83 is mounted on the step part 182c of the plate receiving member 182, the plate hole part 83b is rotatably fitted in the small-diameter part 182a of the plate receiving member 182, and the washer 184 is in contact with the upper surface of the right retaining plate 83, whereby the left and right retaining plates 82, 83 slide with the washer 184 and the plate receiving members 181, 182 that function as a bushing for promoting slippage, and the left and right retaining plates 82, 83 do not come in contact with the lower case 143 of the upper speed change unit 55 shown in FIG. 5.

Figure 8:
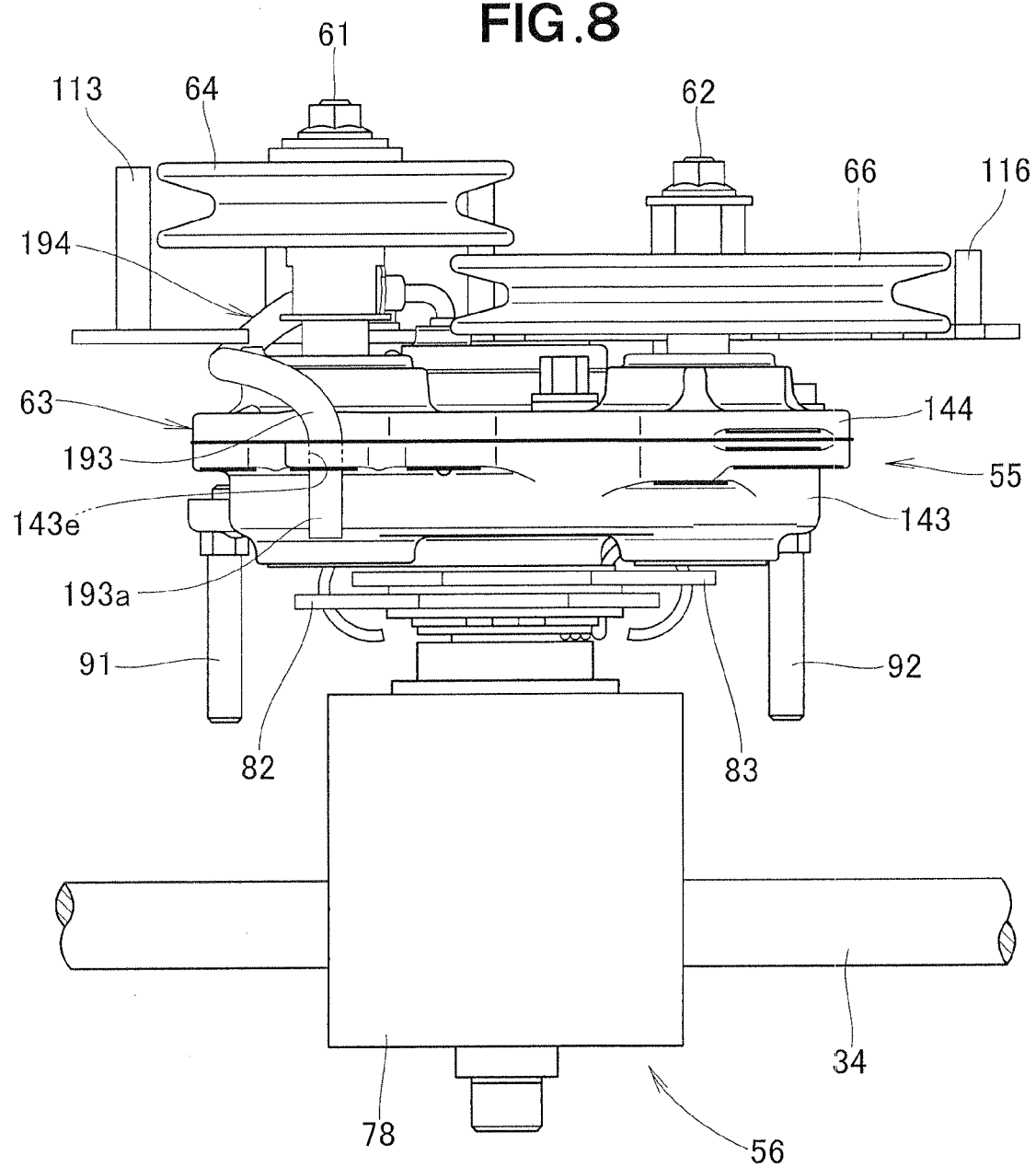
FIG. 8 is a rear view showing a speed change device of FIG. 2.

As shown in FIG. 8, the first pulley 64 is provided in a higher position than the second pulley 66; the rotation pins 91, 92 are provided on the left and right of the upper speed change unit case 63, i.e., the lower case 143; and the distal end part 193a of the breather hose 193 that forms the breather passage 194 is inserted into a hose fixing hole 143e provided at the rear of the lower case 143, the hose fixing hole 143e being formed so as to open downward. There is consequently no risk of rainwater or the like being drawn into the breather passage 194.

Figure 9:
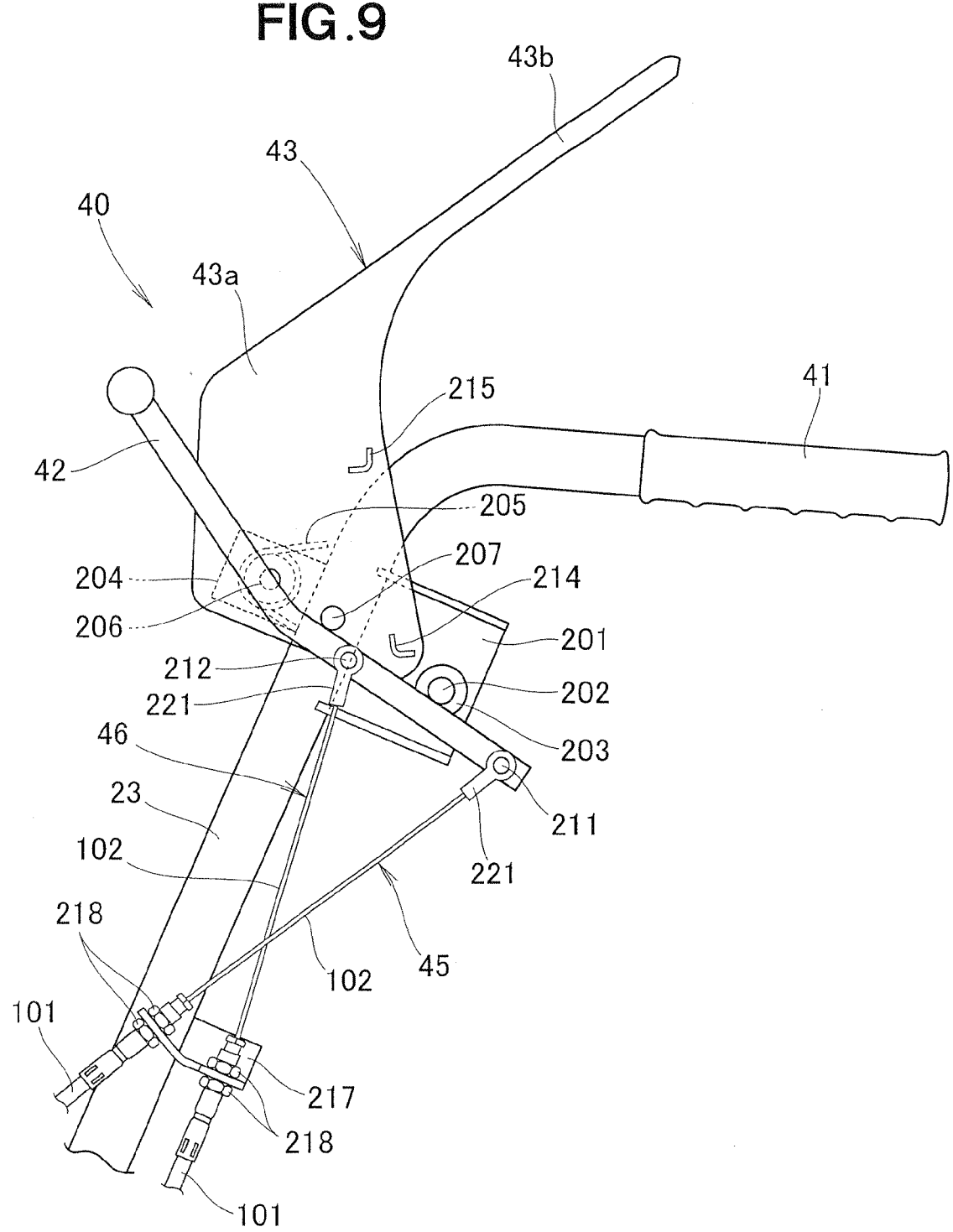
FIG. 9 is a side view showing an embodiment of the forward-reverse switch operating mechanism of FIG. 1.

FIG. 9 shows the forward-reverse switch operating mechanism 40. A rear bracket 201 is attached to the rear side of the right-side handle 23. A shaft receiving member 203 provided to the forward-reverse switching lever 42 is fitted on a rear support shaft 202 provided to the rear bracket 201, and the forward-reverse switching lever 42 is thereby rotatably attached to the rear bracket 201. The first cable 45 is coupled with the rear part, i.e., the rear end (farther to the rear than the rear support shaft 202) of the forward-reverse switching lever 42, and the second cable 46 is coupled at a point toward the center part (farther forward than the rear support shaft 202) of the forward-reverse switching lever 42. A front bracket 204 is attached to the front side of the handle 23. The locking lever 43 is rotatably attached to a front support shaft 206 provided to the front bracket 204. The reference numeral 205 refers to a helical torsion spring provided between the handle 23 and the locking lever 43 in order to urge the rear end part of the locking lever 43 away from the grip 41 (in the counterclockwise direction of FIG. 9).

The forward-reverse switching lever 42 is provided with a lock receiving piece 207 that is restrained when rotation of the forward-reverse switching lever 42 is locked by the locking lever 43 over the center part of the forward-reverse switching lever 42. The reference numerals 211 and 212 refer to coupling pins provided on the side of the rear part of the forward-reverse switching lever 42 in order to couple the first cable 45 and the second cable 46 with the forward-reverse switching lever 42.

The forward-reverse switching lever 42 is in the neutral position shown in FIG. 9 when the elastic force of the tension coil spring 84 of the maintaining mechanism 70 shown in FIG. 2 causes the left and right retaining plates 82, 83 to clamp the upper speed change unit positioning pin 77 and the retaining position pin 81, and the first cable 45 and the second cable 46 are both in a state of being pulled by the tension coil springs 94 (see FIG. 2).

The locking lever 43 is a component in which a shaft-supported part 43a supported by the front support shaft 206, and a narrow grasped part 43b that extends from the shaft-supported part 43a are integrally formed, and two lock pieces 214, 215 that are L-shaped as viewed from the side and capable of engaging with the lock receiving piece 207 of the forward-reverse switching lever 42 are provided to the side surface of the shaft-supported part 43a.

In each of the first cable 45 and the second cable 46, an outer cable 101 is attached by a nut 218 to a cable bracket 217 provided to the handle 23, and an end fitting 221 attached to the distal end of an inner wire 102 is rotatably coupled with the coupling pins 211, 212 of the forward-reverse switching lever 42.

The forward-reverse switch operating mechanism 40 has the components described above, i.e., the forward-reverse switching lever 42, the rear bracket 201, the rear support shaft 202, the shaft receiving member 203, the locking lever 43, the front bracket 204, the front support shaft 206, and the helical torsion spring 205.

The operation of the forward-reverse switch operating mechanism 40 described above will next be described.

FIGS. 10A and 10B show a state in which the forward-reverse switching lever 42 of the forward-reverse switch operating mechanism 40 is tipped forward from the neutral state.

When the forward-reverse switching lever 42 is in the neutral position indicated by the double-dashed line in FIG. 10A, the V belts 52, 53 shown in FIG. 3 are both in a slackened state even when the engine is operating, and power is not transmitted to the first input shaft 61 and the second input shaft 62 from the crankshaft 27 of the engine. Since the travel shaft 34 therefore does not rotate, and the crawler travel units 14, 16 shown in FIG. 1 do not rotate, the small-sized snow remover 10 is stopped. Specifically, the speed change device 13 is in neutral.

When the forward-reverse switching lever 42 is tipped forward as indicated by the arrow A (tipped to the forward position (forward switch position) indicated by the solid line from the neutral position indicated by the double-dashed line) in order to cause the small-sized snow remover to travel forward, the inner wire 102 of the first cable 45 is pulled as indicated by the arrow B. At this time, the inner wire 102 of the second cable 46 is pulled into the outer cable 101 of the second cable 46 by the tension of the tension coil spring 94 (FIG. 2).

In FIG. 10B, with the forward-reverse switching lever 42 still tipped forward, the locking lever 43 is then tipped toward the grip 41 as indicated by the arrow C, and the grasped part 43b of the locking lever 43 is grasped together with the grip 41 by hand; i.e., the locking lever 43 is pushed toward the handle 23.

As a result, the lock piece 214 among the two lock pieces 214, 215 of the locking lever 43 comes in contact with the lock receiving piece 207 of the forward-reverse switching lever 42, as indicated by the arrow D, and restricts the return, i.e., the clockwise rotation, of the forward-reverse switching lever 42. This is the locked state (retained state) of the forward-reverse switching lever 42.

Figure 11A:
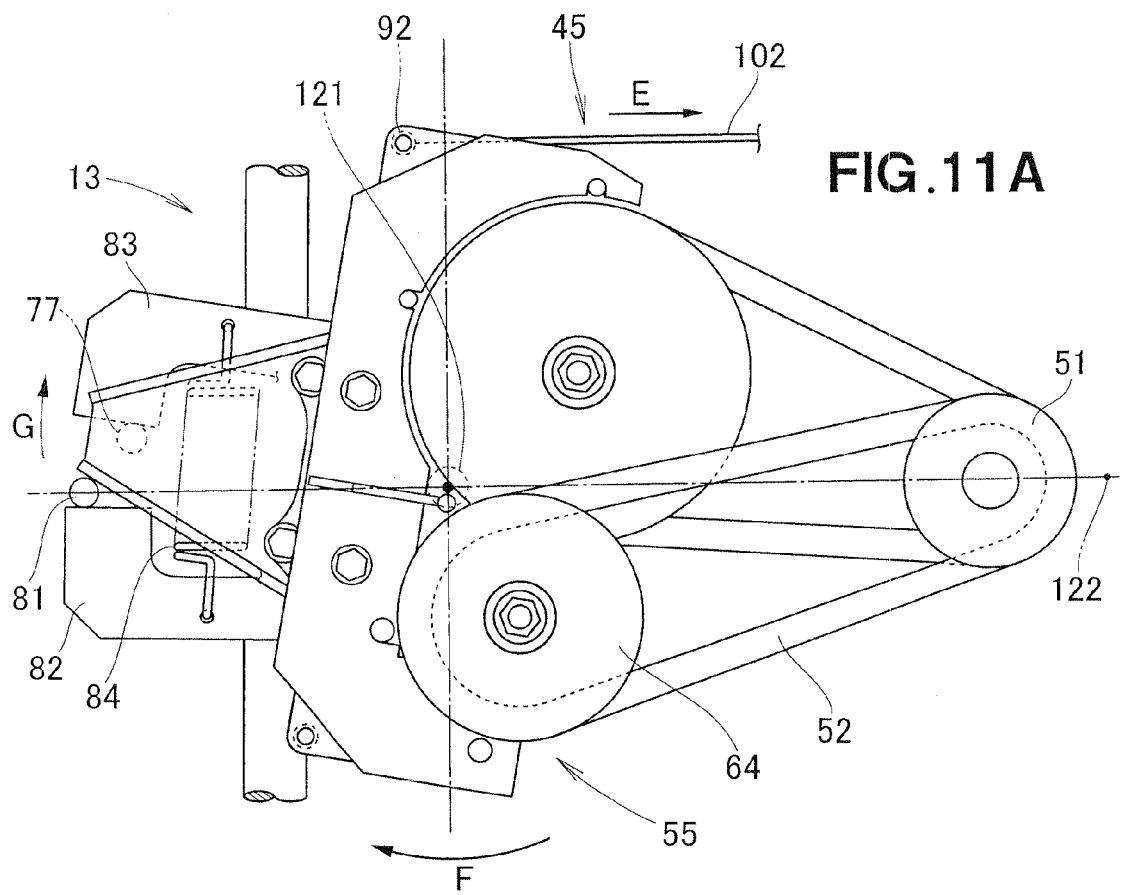
FIGS. 11A and 11B are schematic views showing the movement of the power transmission device as the forward-reverse switching lever is tipped forward.
Figure 11B:
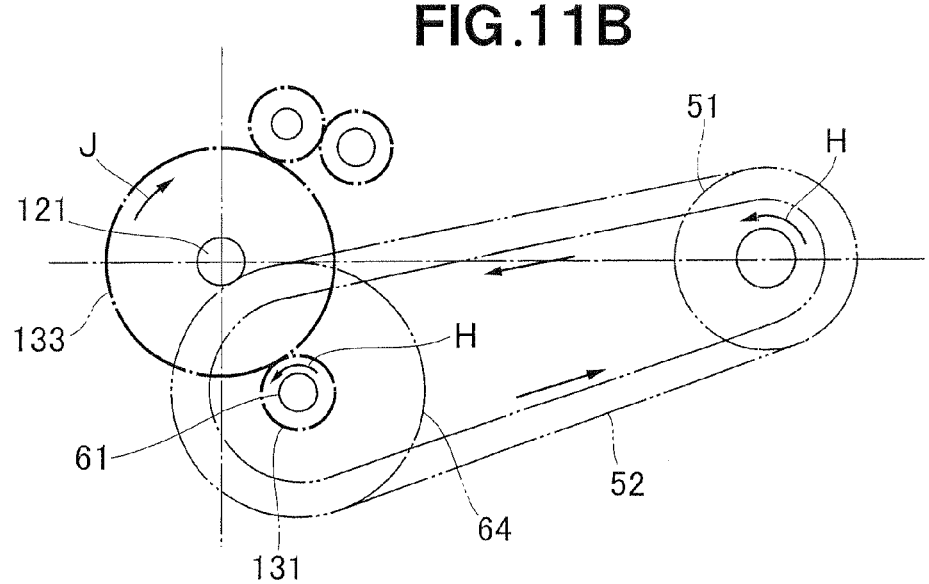

FIGS. 11A and 11B show a state in which the first V belt of the power transmission device is pulled.

In FIG. 11A, since the right-side rotation pin 92 is pulled when the inner wire 102 (see FIGS. 10A and 10B) of the first cable 45 is pulled as indicated by the arrow E, the upper speed change unit 55 of the speed change device 13 rotates about the drive shaft 121 as indicated by the arrow F, and in conjunction with this rotation, the first V belt 52 is tensed and the second V belt 53 is slackened.

At this time, since the upper speed change unit positioning pin 77 pushes the right retaining plate 83 in conjunction with the rotation of the upper speed change unit 55, the right retaining plate 83 rotates as indicated by the arrow G. As a result, the tension coil spring 84 is extended, and the elastic force of the tension coil spring 84 that causes the right retaining plate 83 to return to the original position (on the center line 122) thereof gradually increases.

In FIG. 11B, when the first V belt 52 is tensed, the rotation of the drive pulley 51, e.g., rotation in the direction of the arrow H, is transmitted to the first pulley 64 via the first V belt 52, the first drive gear 131 attached to the first input shaft 61 rotates in the direction of the arrow H, and the driven gear 133 that is meshed with the first drive gear 131 rotates in the direction of the arrow J (positive rotation). The small-sized snow remover thereby travels forward.

In FIG. 10B, in order to stop forward travel and stop the small-sized snow remover, the operator releases his grip on the locking lever 43 in order to release the locking of the forward-reverse switching lever 42. The forward-reverse switching lever 42 is thereby no longer restrained by the locking lever 42, and the forward-reverse switching lever 42 is returned to the neutral position indicated by the double-dashed line in FIG. 10A by the elastic force of the tension coil springs 84, 94 shown in FIG. 2, and the neutral state is achieved.

FIGS. 12A and 12B show a state in which the forward-reverse switching lever 42 of the forward-reverse switch operating mechanism 40 is tipped backward.

In FIG. 12A, when the forward-reverse switching lever 42 is tipped backward from the neutral position (tipped to the reverse position (reverse switch position) indicated by the solid line from the neutral position indicated by the double-dashed line) in order to cause the small-sized snow remover to travel in reverse, the inner wire 102 of the second cable 46 is pulled as indicated by the arrow N, and the inner wire 102 of the first cable 45 is pulled into the outer cable 101 of the first cable 45 by the tension of the tension coil spring 94 (FIG. 2).

In FIG. 12B, with the forward-reverse switching lever 42 still tipped backward, the locking lever 43 is then tipped toward the grip 41 as indicated by the arrow P, and the grasped part 43b of the locking lever 43 is grasped together with the grip 41 by hand; i.e., the locking lever 43 is pushed toward the handle 23.

As a result, the lock piece 215 among the two lock pieces 214, 215 of the locking lever 43 comes in contact with the lock receiving piece 207 of the forward-reverse switching lever 42, as indicated by the arrow Q, and restricts the return, i.e., the counterclockwise rotation, of the forward-reverse switching lever 42. This is the locked state of the forward-reverse switching lever 42.

Figure 13A:
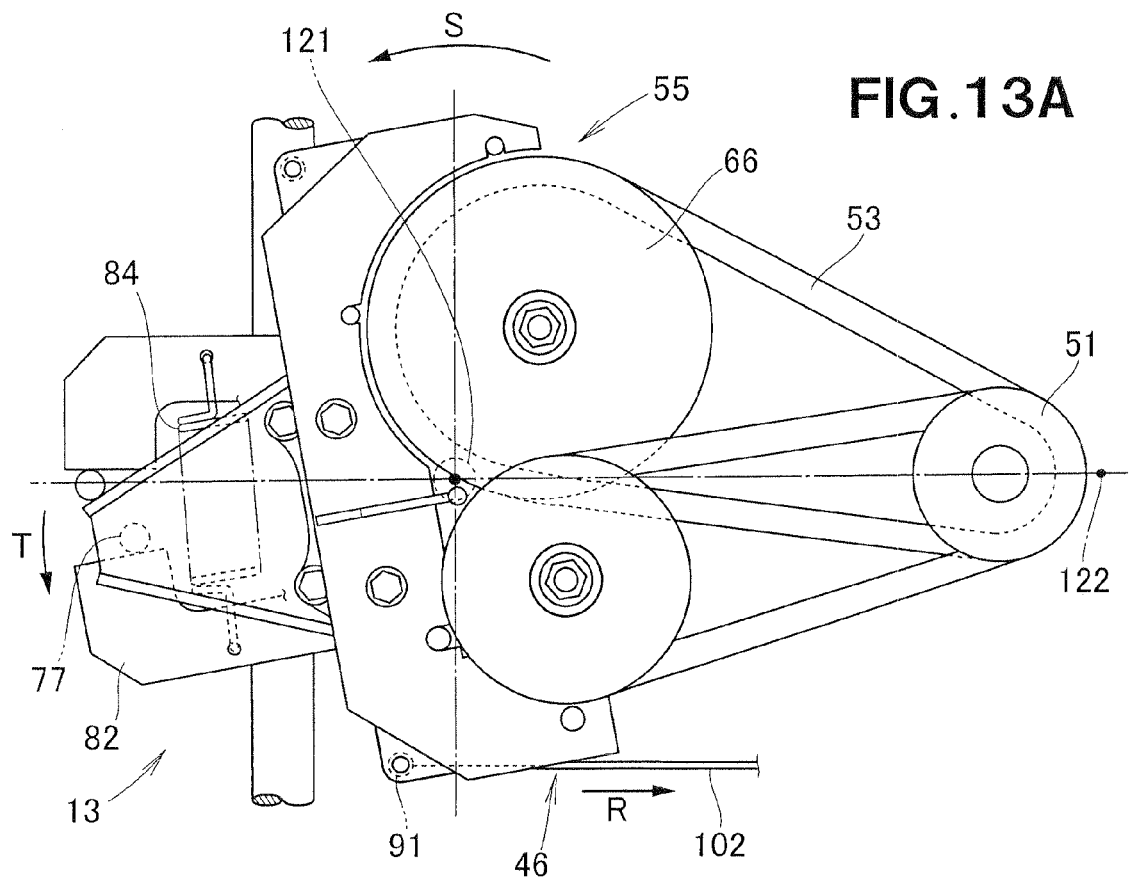
FIGS. 13A and 13B are schematic views showing the movement of the power transmission device as the forward-reverse switching lever is tipped backward.
Figure 13B:
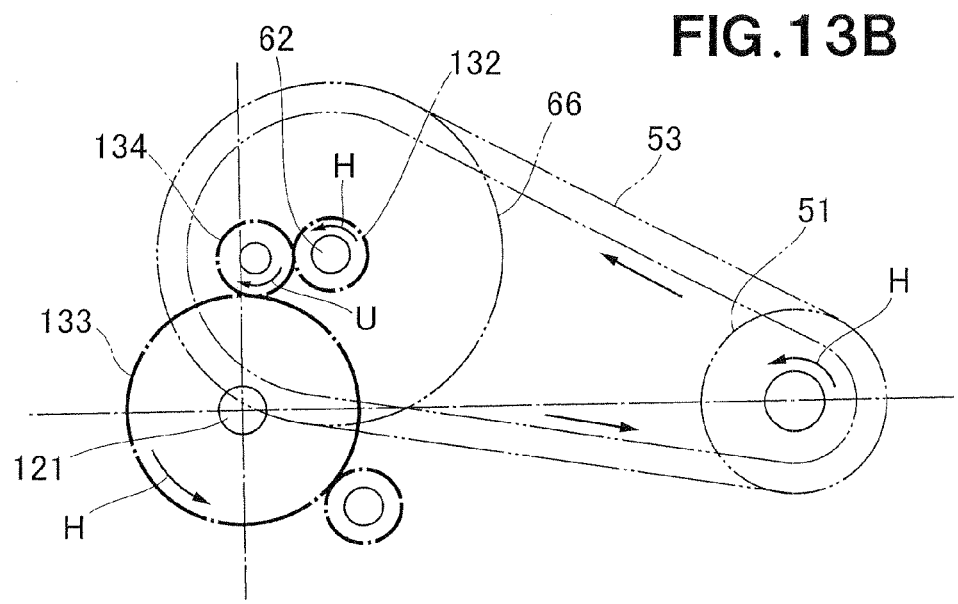

FIGS. 13A and 13B show the state of the second V belt of the power transmission device when the forward-reverse switching lever 42 shown in FIG. 12B is tipped backward.

In FIG. 13A, since the left-side rotation pin 91 is pulled when the inner wire 102 (see also FIGS. 12A and 12B) of the second cable 46 is pulled as indicated by the arrow R, the upper speed change unit 55 of the speed change device 13 rotates about the drive shaft 121 as indicated by the arrow S, and in conjunction with this rotation, the second V belt 53 is tensed. At this time, since the upper speed change unit positioning pin 77 pushes the left retaining plate 82, the left retaining plate 82 rotates as indicated by the arrow T.

As a result, the tension coil spring 84 is extended, and the elastic force of the tension coil spring 84 that causes the left retaining plate 82 to return to the original position (on the center line 122) thereof gradually increases.

In FIG. 13B, when the second V belt 53 is tensed, the rotation of the drive pulley 51, e.g., rotation in the direction of the arrow H, is transmitted to the second pulley 66 via the second V belt 53, the second drive gear 132 attached to the second input shaft 62 rotates in the direction of the arrow H, the idle gear 134 that meshes with the second drive gear 132 rotates in the direction of the arrow U, and the driven gear 133 that is meshed with the idle gear 134 rotates in the direction of the arrow H (negative rotation). The small-sized snow remover thereby travels in reverse.

In FIG. 12B, in order to stop reverse travel and stop the small-sized snow remover, the operator releases his grip on the locking lever 43 in order to release the locking of the forward-reverse switching lever 42. The forward-reverse switching lever 42 is thereby no longer restrained by the locking lever 42, and the forward-reverse switching lever 42 is returned to the neutral position indicated by the double-dashed line in FIG. 12A by the elastic force of the tension coil springs 84, 94 shown in FIG. 2, and the neutral state is achieved.

As shown in FIGS. 1, 2, and 4 described above, the power transmission device 25 capable of switching the rotation direction of the drive shaft 121 between positive rotation and negative rotation when power is transmitted from a drive source (engine 12) to the drive shaft 121 via the power transmission device 25 is provided with a positive rotation drive pulley (first drive pulley 51A) and a negative rotation drive pulley (second drive pulley 51B) coupled with the output shaft (crankshaft 27) of the engine 12; a positive rotation shaft (first input shaft 61) coupled with the drive shaft 121 via a positive rotation gear train (first gear train 137); a positive rotation driven pulley (first pulley 64) attached to the first input shaft 61; a positive rotation belt (first V belt 52) mounted on the first drive pulley 51A and the first pulley 64; a negative rotation shaft (second input shaft 62) coupled with the drive shaft 121 via a negative rotation gear train (second gear train 138); a negative rotation driven pulley (second pulley 66) attached to the second input shaft 62; a negative rotation belt (second V belt 53) mounted on the second driven pulley 51B and the second pulley 66; a belt switching means (rotation mechanism 90) for switching the power-transmitting belt among the first and second V belts 52, 53 by tensing only one of the V belts 52, 53; and a neutral state maintaining means (70) for maintaining a neutral state in which power transmission by both of the first and second V belts 52, 53 is interrupted, by slackening both the first and second V belts 52, 53. The second V belt 53 can therefore be slackened from a tensed state at the same time that the first V belt 52 is tensed from a slackened state by the rotation mechanism 90, or the second V belt 53 can be tensed from a slackened state at the same time that the first V belt 52 is slackened from a tensed state, and it is possible to smoothly switch between positive and negative rotation of the drive shaft 121.

It is also possible to set a neutral state in which the coupling between the drive shaft 121 and the crankshaft 27 of the engine 12 is interrupted, as a state in which the V belts 52, 53 are both slackened, at an intermediate point of switching between positive and negative rotation of the drive shaft 121. Consequently, there is no need for a speed change device in which a plurality of gears is provided and high-precision components are required, or for a travel clutch or other unit having numerous components, such as in conventional techniques, and the power transmission device 25, more specifically the speed change device 13, can be endowed with a simple structure.

A travel clutch such as a conventional travel clutch is not provided in the power transmission device 25 of the present invention, but because the rotation mechanism 90 has a structure for tensing or slackening the first and second V belts 52, 53 to transmit power or interrupt the transmission of power, the rotation mechanism 90 can be considered to be a type of clutch. This clutch has a simple structure that merely causes the upper speed change unit 55 to rotate about the drive shaft 121, and cost can thereby be reduced.

Furthermore, the maintaining mechanism 70 enables the abovementioned neutral state to be maintained, and the drive shaft 121 can be freely rotated without being bound by the crankshaft 27 of the engine 12. Therefore, in a case in which a general-purpose machine (small-sized snow remover 10) in which wheels, crawler belts, or another travel means (crawler travel units 14, 16) is attached to the drive shaft 121 is pushed or pulled by hand, for example, the crawler travel units 14, 16 rotate easily, and the small-sized snow remover 10 can therefore be easily pushed or pulled.

In the power transmission device 25 of the present invention, positive rotation and negative rotation of the drive shaft 121 can be smoothly switched by a simple structure, a neutral state can be set in which the drive shaft 121 is isolated from the crankshaft 27 of the engine 12, and this neutral state can be maintained by the maintaining mechanism 70. The small-sized snow remover 10 provided with the crawler travel units 14, 16 can therefore be easily pushed or pulled by a human, and the small-sized snow remover 10 can easily be made to change direction or move.

FIG. 14 shows the balance of moments acting on the locking lever 43 and the forward-reverse switching lever 42 in the forward position in the forward-reverse switch operating mechanism 40.

When the forward-reverse switching lever 42 is tipped forward, the force that acts on the coupling pin 211 (specifically, the axis line 211a of the coupling pin 211 (the line that extends toward the back from the drawing surface, indicated by a black circle)) from the first cable 45 is designated as F1, the distance in the direction orthogonal to force F1 between the axis line 211a and the rear support shaft 202 (specifically, the axis line 202a of the rear support shaft 202 (the line that extends toward the back from the drawing surface, indicated by a black circle)) is designated as L1, the force (retaining force) pushing down the distal end part (point 42a) of the forward-reverse switching lever 42 is designated as F2 (this force acting in the direction orthogonal to the line segment that connects the axis line 202a and the point 42a), the distance between the axis line 202a and the point 42a is designated as L2, the force acting on the point 225 that is the point of contact between the lock receiving piece 207 and the lock piece 214 is designated as F3 (this force acting in the direction orthogonal to the line segment that connects the axis line 202a and the point 225), the distance between the axis line 202a and the point 225 is designated as L3, the distance in the direction orthogonal to the force F3 between the point 225 and the axis line 206a of the front support shaft 206 is designated as L4, the force (retaining force) acting on the load center 43c of the grasped part 43b of the locking lever 43 is designated as F4 (this force acting in the direction orthogonal to the line segment that connects the axis line 206a and the load center 43c), and the distance between the axis line 206a and the load center 43c is designated as L5.

The retaining force F2 of the forward-reverse switching lever 42 will first be calculated.

Based on the balance of the clockwise and counterclockwise moments of the forward-reverse switching lever 42, F1·L1=F2·L2. Accordingly, F2=(L1/L2)·F1.

The retaining force F4 of the locking lever 43 will next be calculated.

Based on the balance of the clockwise and counterclockwise moments of the forward-reverse switching lever 42, F1·L1=F3·L3. Accordingly, F3=(L1/L3)·F1.

From the moment about the axis line 206a of the locking lever 43, F3·L4=F4·L5.

Accordingly, F4=(L4/L5)·F3, and when F3=(L1/L3)·F1 is substituted into this equation, F4=L1·L4/(L3·L5)·F1 is obtained.

Based on F2 and F4 above, F2:F4=(1/L2):(L4/(L3·L5)).

For example, when L1=2.5 cm, L2=17.4 cm, L3=5.0 cm, L4=0.3 cm, and L5=20.4 cm, F2:F4=19.5:1, and the retaining force F4 of the locking lever 43 is reduced to approximately 1/20 the retaining force F2 of the forward-reverse switching lever 42. However, this value does not take into account friction and other mechanical loss in components of the forward-reverse switch operating mechanism 40.

FIG. 15 shows the balance of moments acting on the locking lever 43 and the forward-reverse switching lever 42 in the reverse position in the forward-reverse switch operating mechanism 40.

When the forward-reverse switching lever 42 is tipped to the reverse position, the force that acts on the coupling pin 212 (specifically, the axis line 212a of the coupling pin 212 (the line that extends toward the back from the drawing surface, indicated by a black circle)) from the second cable 46 is designated as F5, the distance in the direction orthogonal to force F5 between the axis line 212a and the axis line 202a of the rear support shaft 202 is designated as L6, the force (retaining force) pulling the distal end part (point 42a) of the forward-reverse switching lever 42 to the rear is designated as F6 (this force acting in the direction orthogonal to the line segment that connects the axis line 202a and the point 42a), the force acting on the point 226 that is the point of contact between the lock receiving piece 207 and the lock piece 215 is designated as F7 (this force acting in the direction orthogonal to the line segment that connects the axis line 202a and the point 226), the distance between the axis line 202a and the point 226 is designated as L7, the distance in the direction orthogonal to the force F7 between the point 226 and the axis line 206a of the front support shaft 206 is designated as L8, and the force (retaining force) acting on the load center 43c of the grasped part 43b of the locking lever 43 is designated as F8 (this force acting in the direction orthogonal to the line segment that connects the axis line 206a and the load center 43c).

The retaining force F6 of the forward-reverse switching lever 42 will first be calculated.

Based on the balance of the clockwise and counterclockwise moments of the forward-reverse switching lever 42, F5·L6=F6·L2. Accordingly, F6=(L6/L2)·F5.

The retaining force F8 of the locking lever 43 will next be calculated.

Based on the balance of the clockwise and counterclockwise moments of the forward-reverse switching lever 42, F5·L6=F7·L7. Accordingly, F7=(L6/L7)·F5.

From the moment about the axis line 206a of the locking lever 43, F7·L8=F8·L5. Accordingly, F8=(L8/L5)·F7, and when F7=(L6/L7)·F5 is substituted into this equation, F8=L6·L8/(L5·L7)·F5 is obtained.

Based on F2 and F4 above, F6:F8=(1/L2):(L8/(L5·L7)).

For example, when L2=17.4 cm, L5=20.4 cm, L6=2.5 cm, L7=5.4 cm, and L8=0.3 cm, F6:F8=21.1:1, and the retaining force F8 of the locking lever 43 is reduced to approximately 1/20 the retaining force F6 of the forward-reverse switching lever 42. However, this value does not take into account friction and other mechanical loss in components of the forward-reverse switch operating mechanism 40.

Figure 16:
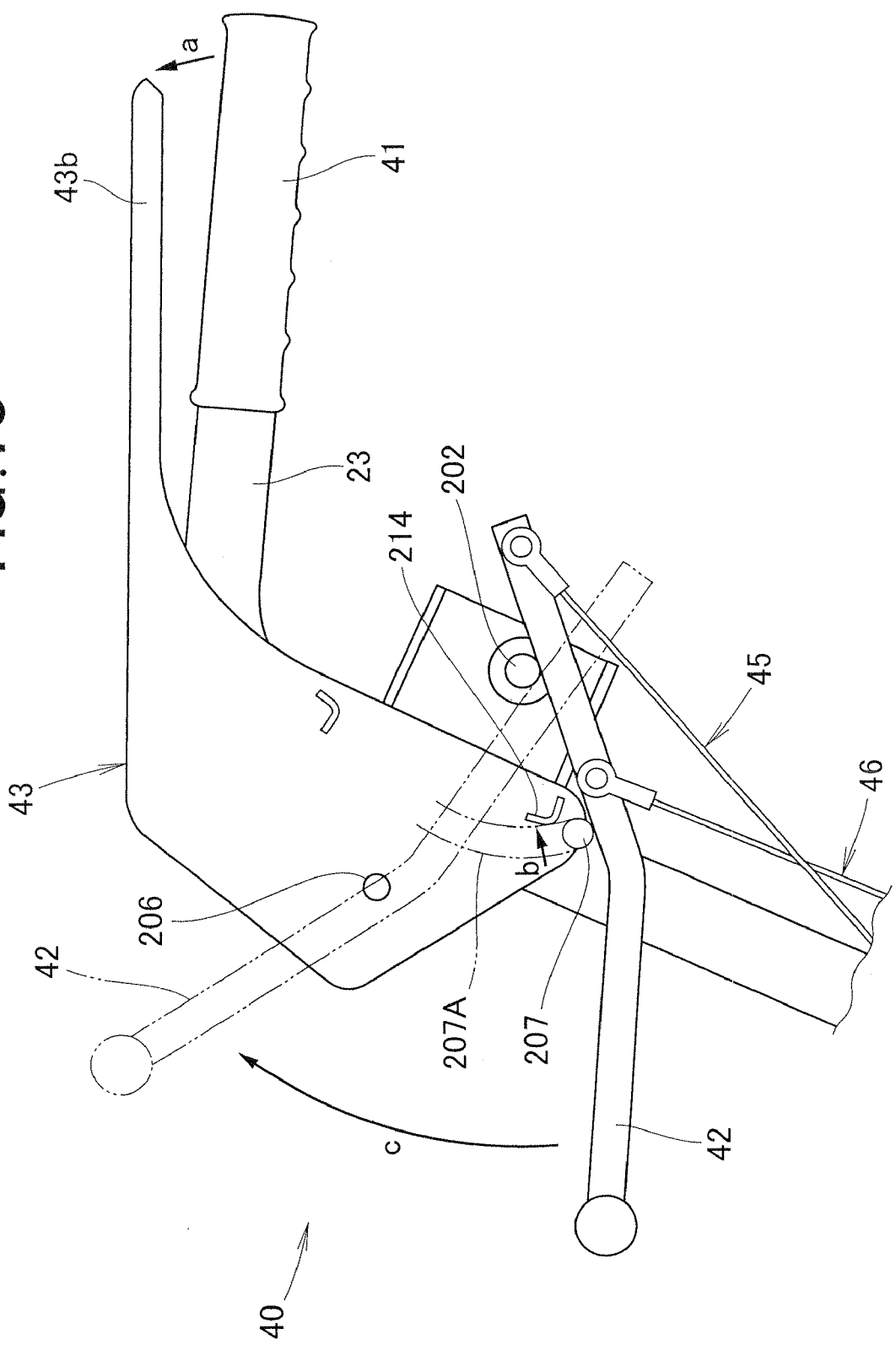
FIG. 16 is a view showing a state in which the forward position of the forward-reverse switching lever is released from a state of being maintained by the locking lever.

FIG. 16 shows a state in which forward travel is turned off by the forward-reverse switch operating mechanism 40.

From a state in which the forward-reverse switching lever 42 is in the forward position (indicated by the solid line) and retained in the forward position by the locking lever 43, the grasped part 43b of the locking lever 43 is moved away from the grip 41 of the handle 23 a predetermined distance, as indicated by the arrow a.

Specifically, the locking lever 43 is rotated counterclockwise about the front support shaft 206 until the lock piece 214 of the locking lever 43 is outside the rotational trajectory 207A of the lock receiving piece 207 of the forward-reverse switching lever 42, as indicated by the arrow b.

As a result, the lock receiving piece 207 is no longer restrained, and the forward-reverse switching lever 42 returns as indicated by the arrow c to the neutral position indicated by the double-dashed line. Forward travel of the small-sized snow remover is thereby turned off, and the small-sized snow remover is stopped.

Figure 17:
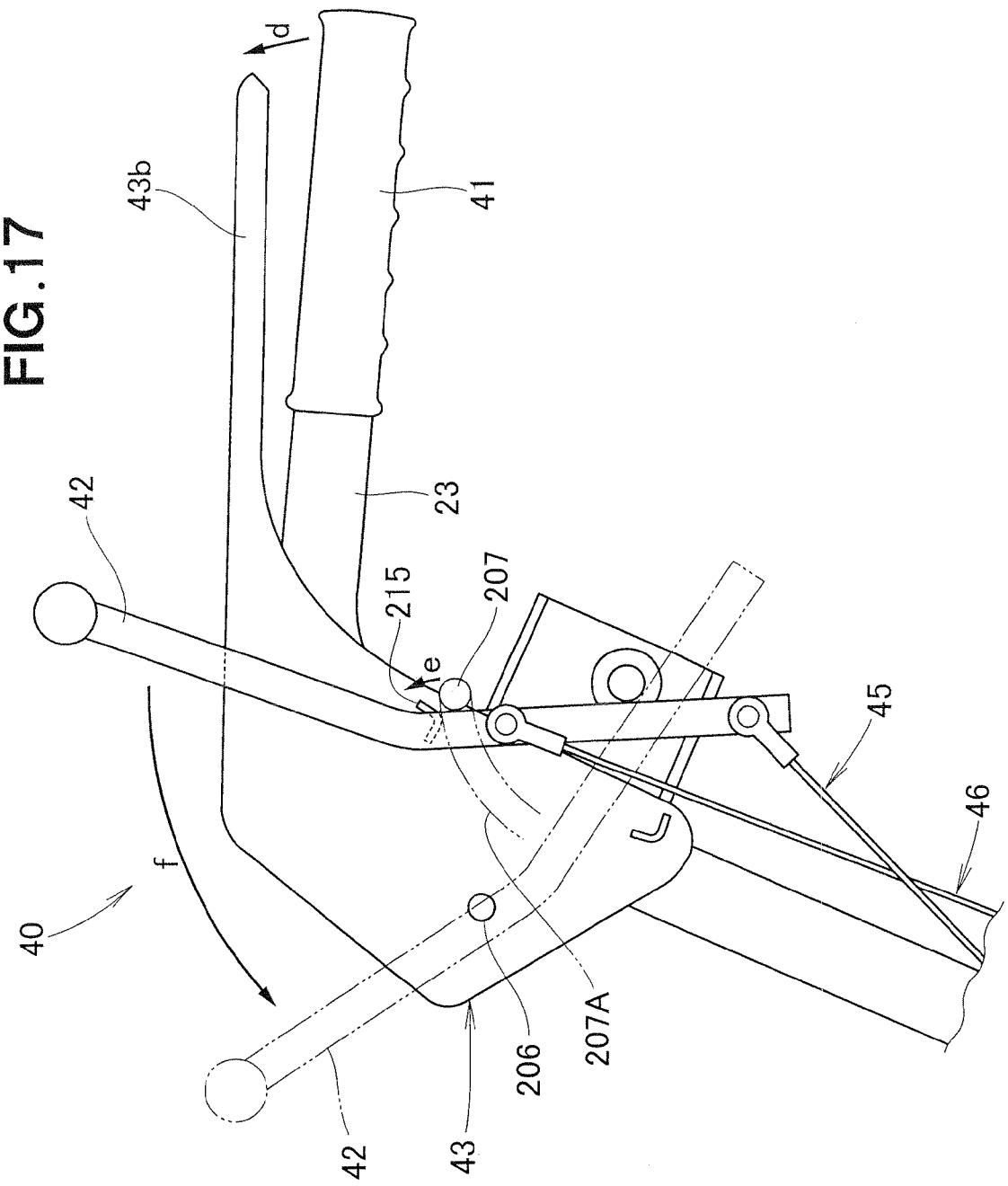
FIG. 17 is a view showing a state in which the reverse position of the forward-reverse switching lever is released from a state of being maintained by the locking lever.

FIG. 17 shows the operations whereby reverse travel is turned off by the forward-reverse switch operating mechanism 40.

From a state in which the forward-reverse switching lever 42 is in the reverse position (indicated by the solid line) and retained in the reverse position by the locking lever 43, the grasped part 43b of the locking lever 43 is moved away from the grip 41 a predetermined distance, as indicated by the arrow d.

Specifically, the locking lever 43 is rotated counterclockwise about the front support shaft 206 until the lock piece 215 of the locking lever 43 is outside the rotational trajectory 207A of the lock receiving piece 207 of the forward-reverse switching lever 42, as indicated by the arrow e.

As a result, the lock receiving piece 207 is no longer restrained, and the forward-reverse switching lever 42 returns as indicated by the arrow f to the neutral position indicated by the double-dashed line. Reverse travel of the small-sized snow remover is thereby turned off, and the small-sized snow remover is stopped.

As shown in FIGS. 1 and 9 above, the forward-reverse switching lever 42 that is urged toward the neutral position and is capable of switching between forward and reverse travel of the small-sized snow remover 10 according to the direction in which the forward-reverse switching lever 42 is tipped from the neutral position, and the locking lever 43 for causing the forward-reverse switching lever 42 to be retained in the forward or reverse switch position by pushing the forward-reverse switching lever 42 against the handle 23 are provided in the forward-reverse switch operating mechanism 40 disposed in the vicinity of the handle 23 of the small-sized snow remover 10 as a traveling machine that has wheels, crawler belts 33, or another travel unit (crawler travel units 14, 16). Since the forward-reverse switching lever 42 is therefore locked by the locking lever 43 without the forward-reverse switching lever 42 as such being retained in a switch position, the retaining force of the locking lever 43 can be reduced by taking into account the arm length required to reach the forward-reverse switching lever 42 and the locking lever 43.

The structure in which the locking lever 43 is added to the forward-reverse switching lever 42 is simple, the cost of the forward-reverse switch operating mechanism 40 can be reduced, and the forward-reverse switching lever 42 can be retained in the forward switch position or the reverse switch position in the same manner merely by pushing the locking lever 43 toward the handle 23. Ease of operation can therefore be enhanced.

As shown in FIG. 9, since the lock pieces 214, 215 for maintaining the forward and reverse switch positions, respectively, of the forward-reverse switching lever 42 by contacting the stopper pin 207 as a lock-receiving piece provided to the forward-reverse switching lever 42 are provided to the locking lever 43, the forward and reverse switch positions of the forward-reverse switching lever 42 can be reliably maintained by the lock pieces 214, 215 contacting the stopper pin 207 in the simple structure in which the lock pieces 214, 215 are provided to the locking lever 43, the cost of the locking lever 43 can be reduced, and reliability can be increased.

Figure 18:
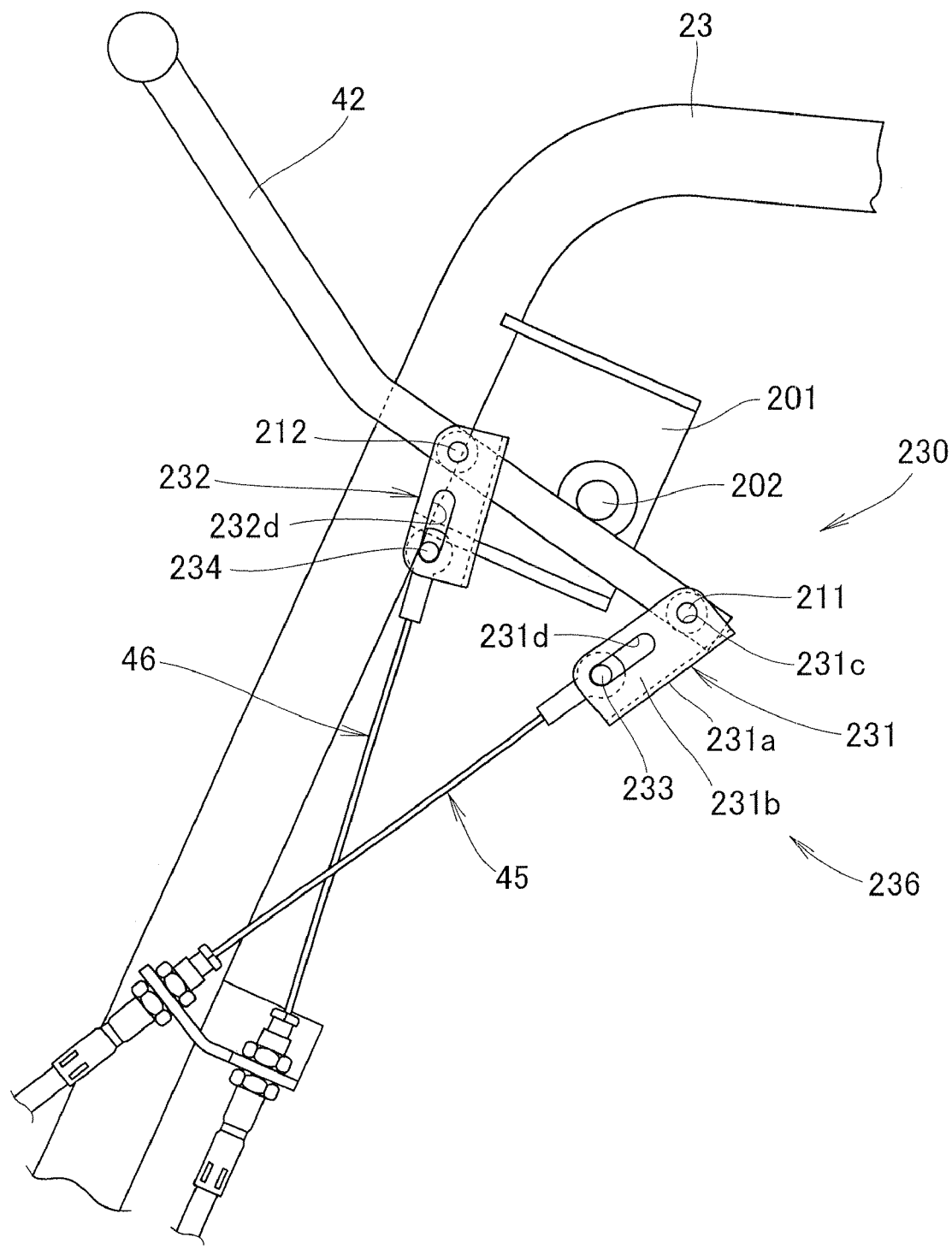
FIG. 18 is a side view showing another embodiment of the forward-reverse switch operating mechanism of FIG. 9.

FIG. 18 shows another embodiment of the forward-reverse switch operating mechanism.

The forward-reverse switch operating mechanism 230 of the other embodiment has the structure of the forward-reverse switch operating mechanism 40 (see FIG. 9), and is also provided with first and second links 231, 232 that are coupled with the coupling pins 211, 212 so as to be able to swing; and first and second coupling pins 233, 234 for coupling the links 231, 232 with the first cable 45 and the second cable 46, respectively.

The first and second links 231, 232 and the first and second coupling pins 233, 234 described above constitute a coupler 236 for coupling the forward-reverse switching lever 42 with the first cable 45 and second cable 46.

The first link 231 is folded in a cross-sectional U-shape in which side walls 231b are folded up from both edges of a bottom wall 231a, and pin insertion holes 231c in which the coupling pins 211, 212 are rotatably inserted, and elongated holes 231d in which the coupling pins 233, 234 are rotatably and movably inserted are formed in the two side walls 231b, 231b. The second link 232 has the same structure as the first link 231.

In FIG. 18, the forward-reverse switching lever 42 is in the neutral position, and the first cable 45, the second cable 46, and the two first and second links 231, 232 are tensed by the tension coil spring 94 (FIG. 2).

Figure 19B:
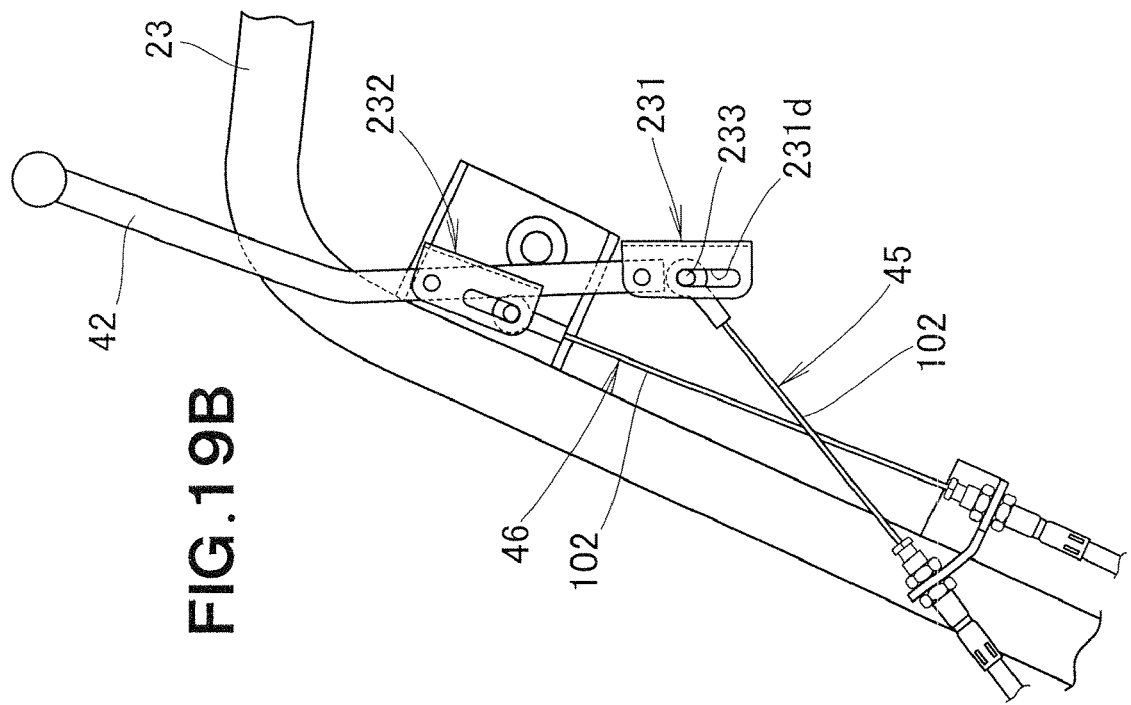
FIGS. 19A and 19B are side views showing the movement of the forward-reverse switch operating mechanism according to the other embodiment shown in FIG. 18.
Figure 19A:
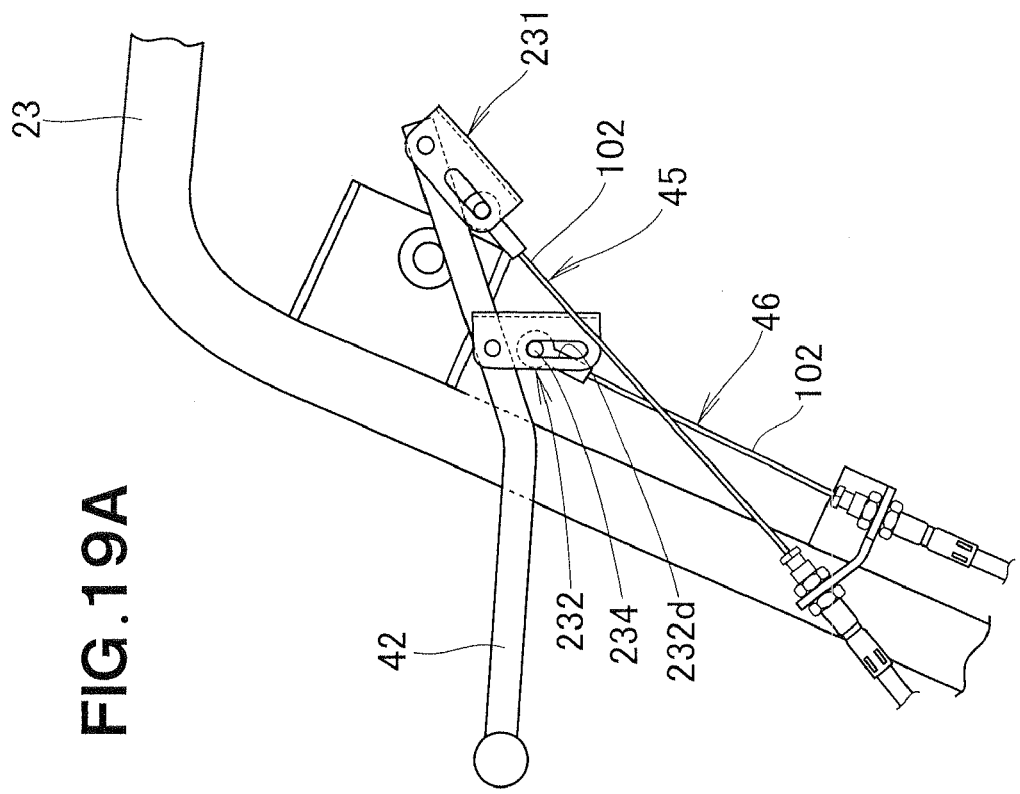

FIGS. 19A and 19B show the operation of the forward-reverse switch operating mechanism according to the other embodiment shown in FIG. 18.

FIG. 19A shows the state of the first cable 45, the second cable 46, and the first and second links 231, 232 coupled with the forward-reverse switching lever 42 that is in the forward position. Specifically, the inner wire 102 of the first cable 45 is in a tensed state, and the tension on the inner wire 102 of the second cable 46 has been removed.

The second link 232 on the side of the second cable 46 hangs downward, and the coupling pin 234 at the end of the second cable 46 moves to the upper end of the elongated hole 232d, whereby the slack of the inner wire 102 of the second cable 46 is reduced.

FIG. 19B shows the state of the first cable 45, the second cable 46, and the first and second links 231, 232 coupled with the forward-reverse switching lever 42 that is in the reverse position. Specifically, the inner wire 102 of the second cable 46 is in a tensed state, and the tension on the inner wire 102 of the first cable 45 has been removed.

The first link 231 on the side of the first cable 45 hangs downward, and the coupling pin 233 at the end of the first cable 45 moves to the upper end of the elongated hole 231d, whereby the slack of the inner wire 102 of the first cable 45 is reduced.

As shown in FIGS. 19A and 19B, having the first and second links 231, 232 and the first and second coupling pins 233, 234 interposed between the forward-reverse switching lever 42 and the first cable 45 and second cable 46 allows the first link 231 or the second link 232 to oscillate, and the first and second coupling pins 233, 234 to move within the elongated holes 231d, 232d. The slack in the first cable 45 and the second cable 46 can thereby be minimized.

As shown in FIGS. 18, 19A, and 19B above, the forward-reverse switching lever 42 is coupled with the first cable 45 and the second cable 46 as operating cables via the coupler 236, and the coupler 236 is formed by the first and second links 231, 232 that have elongated holes 231d, 232d in which the coupled ends of the first cable 45 and second cable 46 can move. The slack of the first cable 45 and second cable 46 can therefore be accommodated by the elongated holes 231d, 232d of the first and second links 231, 232, and the oscillation of the first link 231 or the second link 232, and the first cable 45 and the second cable 46 can be made less prone to slackening. The first cable 45 and the second cable 46 consequently do not interfere with operation.

In the other embodiment described above, the first and second links 231, 232 were described as having a U-shaped cross section as shown in FIG. 18, but this configuration is not limiting, and the links may be formed with a rectangular cross-section (angled pipe shape), a circular cross-section (round pipe shape), or a flat plate shape.

Obviously, various minor changes and modifications of the present invention are possible in light of the above teaching. It is therefore to be understood that within the scope of the appended claims the invention may be practiced otherwise than as specifically described.

What is claimed is:

1. A power transmission device capable of switching a direction of rotation of a drive shaft between positive rotation and negative rotation when power from a drive source is transmitted to the drive shaft via the power transmission device, the power transmission device comprising:
   a positive rotation drive pulley and a negative rotation drive pulley that are coupled with an output shaft of the drive source;
   a positive rotation shaft coupled with the drive shaft via a positive rotation gear train;
   a positive rotation driven pulley attached to the positive rotation shaft;
   a positive rotation endless belt trained around the positive rotation drive pulley and the positive rotation driven pulley;
   a negative rotation shaft coupled with the drive shaft via a negative rotation gear train;
   a negative rotation driven pulley attached to the negative rotation shaft;
   a negative rotation endless belt trained around the negative rotation drive pulley and the negative rotation driven pulley;

belt switching means for switching the power-transmitting belt between the positive rotation endless belt and the negative rotation endless belt by tensing only one of the positive rotation endless belt and negative rotation endless belt; and neutral state maintaining means for maintaining a neutral state in which power transmission by both of the positive rotation endless belt and the negative rotation endless belt is interrupted, by slackening both the positive rotation endless belt and the negative rotation endless belt, wherein the belt switching means is coupled with a forward-reverse switch operating mechanism provided in a vicinity of a handle of a travel implement in order to effect positive rotation or negative rotation of the drive shaft, and the forward-reverse switch operating mechanism comprises:

a forward-reverse switching lever for switching between forward and reverse travel of the travel implement according to the direction of tipping from a neutral position, the forward-reverse switching lever being urged to the neutral position; and a locking lever for causing the forward-reverse switching lever to be retained in the switch positions of forward and reverse travel by pushing the locking lever toward the handle, wherein the locking lever and the forward-reverse switching lever are operable independently of each other, wherein the locking lever is operable to be pushed toward the handle with operation of the forward-reverse switching lever, and wherein the neutral state maintaining means comprises:

an upper speed change unit positioning pin attached to and extending downward from an upper speed change unit;

a retaining position pin attached to and extending upward from a lower speed change unit;

left and right pivotable retaining plates, each plate having one end attached to a bottom of the upper speed change unit and an opposite end; and a tension coil spring attached to and extending between the retaining plates, wherein the upper speed change unit positioning pin and the retaining position pin are sandwiched between the opposite ends of the left and right pivotable retaining plates.

2. The power transmission device of claim 1, wherein the locking lever has lock pieces for maintaining the forward and reverse switch positions of the forward-reverse switching lever by making contact with a lock-receiving piece provided to the forward-reverse switching lever.

3. The power transmission device of claim 1, wherein the forward-reverse switching lever is coupled with operating cables via a coupler, and the coupler is formed by rings having elongated holes in which coupled ends of the operating cables are movable.

4. The power transmission device of claim 1, wherein an outside diameter of the negative rotation driven pulley is greater than an outside diameter of the positive rotation driven pulley.

5. The power transmission device of claim 1, wherein the positive rotation driven pulley is provided vertically above and overlaps the negative rotation driven pulley.

* * * * *